(12) United States Patent
Wandrie, III et al.

(10) Patent No.: US 10,711,732 B2
(45) Date of Patent: Jul. 14, 2020

(54) REDUCED HEIGHT PISTON

(71) Applicant: Industrial Parts Depot, LLC, Torrance, CA (US)

(72) Inventors: Henry Maurice Wandrie, III, Torrance, CA (US); HouKit Sam, Torrance, CA (US)

(73) Assignee: INDUSTRIAL PARTS DEPOT, LLC, Torrance, CA (US)

(*) Notice: Subject to any disclaimer, the term of this patent is extended or adjusted under 35 U.S.C. 154(b) by 202 days.

(21) Appl. No.: 15/409,719

(22) Filed: Jan. 19, 2017

(65) Prior Publication Data
US 2018/0202387 A1 Jul. 19, 2018

(51) Int. Cl.
| | | |
|---|---|---|
| F02F 3/00 | (2006.01) | |
| B22D 19/00 | (2006.01) | |
| B23K 20/12 | (2006.01) | |
| B21K 1/18 | (2006.01) | |
| F02F 3/22 | (2006.01) | |
| B23K 101/00 | (2006.01) | |

(52) U.S. Cl.
CPC ............... *F02F 3/003* (2013.01); *B21K 1/18* (2013.01); *B22D 19/0027* (2013.01); *B23K 20/129* (2013.01); *B23K 2101/003* (2018.08); *F02F 3/22* (2013.01); *F02F 2003/0061* (2013.01); *F02F 2200/04* (2013.01); *F02F 2200/06* (2013.01)

(58) Field of Classification Search
CPC .... F02F 3/003; F02F 3/22; B21K 1/18; B22D 19/0027; B23K 20/129
See application file for complete search history.

(56) References Cited

U.S. PATENT DOCUMENTS

| | | | |
|---|---|---|---|
| 5,144,884 | A | 9/1992 | Kelly |
| 5,992,015 | A | 11/1999 | Kurita et al. |
| 6,164,261 | A | 12/2000 | Kruse |
| 6,209,446 | B1 | 4/2001 | Kurita et al. |
| 7,533,601 | B2 | 5/2009 | Lapp et al. |
| 8,371,261 | B2 * | 2/2013 | Scharp .................... B23P 15/10 123/193.6 |
| 8,434,400 | B2 * | 5/2013 | Kemnitz .................. F02F 3/22 92/176 |
| 2004/0055460 | A1 * | 3/2004 | Kohnert .................. F02F 3/003 92/185 |

(Continued)

*Primary Examiner* — Kevin A Lathers
(74) *Attorney, Agent, or Firm* — Wegman Hessler

(57) ABSTRACT

A piston includes an upper member having a crown and a combustion surface extending radially inward from the crown. The upper member includes concentrically oriented first and second upper connecting surfaces integrally formed on the bottom side of the upper member. At least one of the upper connecting surfaces includes a curvilinear and/or multi-arcuate cross-sectional profile. The piston also includes a lower member having a pair of opposing skirts, each skirt defining a bore. The lower member also includes concentrically oriented first and second lower connecting surfaces integrally formed on a top side of the lower member. The lower member is integrally connected to the upper member by friction welding. The curvilinear and/or multi-arcuate profile enables a shortened distance between the top surface of the crown and the bore centerline of the bore. Methods of manufacturing the piston are also disclosed.

37 Claims, 14 Drawing Sheets

(56) References Cited

U.S. PATENT DOCUMENTS

2013/0276740 A1* 10/2013 Wandrie, III ............. F02F 3/22
                                                     123/193.6
2014/0083390 A1    3/2014 Azevedo et al.
2016/0305362 A1* 10/2016 Wandrie, III ........... F02F 3/003

* cited by examiner

REDUCED HEIGHT PISTON

BACKGROUND

1. Field of the Disclosure

The present disclosure is directed to a piston for use in diesel and other internal combustion engines, and more particularly, a piston comprised of discrete upper and lower sections which are friction-welded together and therefore adapted for use in such engines, the design of which may determine the vertical configurations and dimensions of such pistons.

2. Description of Related Art

Present diesel and other high performance heavy-duty internal combustion engines are being operated at extremely high combustion pressures and temperatures. For example, such applications include, but are not limited to, many on and off highway, marine, rail, and passenger vehicle diesel engine piston applications which are required to operate under constant and severe conditions.

Additionally, fuel efficiency, emissions, and packaging considerations combined with such service requirements result in reducing the 'envelope' size of such engines, including the overall height thereof, which further requires the adaptation of pistons with reduced vertical height to permit high output in the smallest practical physical engine size Additionally, increasingly stringent exhaust emissions requirements in the United States and elsewhere exacerbate the operational conditions and require unique design considerations including but not limited to; diesel fuel injection at pressures often in excess of 25,000 psi, recirculation of exhaust gasses, exhaust gas turbo-charging, exhaust gas post treatment, and intake manifold pressures often in excess of 50 psi; and strict limits on lubricating oil consumption as well as the requirement to install not only the core engine, but bulky exhaust emissions control devices in existing installation spaces.

Additionally, pistons used in such engines may benefit from locating the bore of the connection pin between the connecting rod and the piston at the greatest distance possible from the centerline of the crankshaft to therefore reduce the angular displacement of said connecting rod in its operation to the most practical extent possible. Further, the precise and consistent control of the lubricating oil that is deposited upon the cylinder bores by the oil cooling jets cooperating with the piston cooling chambers is required to prevent the combustion of said oil in the power stroke and resultant coking and sticking of the plurality of the sealing rings and to concurrently provide adequate lubrication of the piston and sealing rings to prevent metal to metal contact with the cylinder bores and engine damage; as well as avoiding contamination of exhaust post-treatments systems such as particulate filters and catalytic converters Presently known piston designs, which are commercially practiced, do not adequately address several extremely critical aspects of piston design, manufacturing and performance. For example, current piston designs struggle to obtain proper dimensional attributes to generally maintain required operational and long-term durable performance of the piston to cylinder bore sealing rings, long term structural integrity of the sealing ring locations, and overall resistance to physical stresses and deformation at presently required operating temperatures and pressures as well as minimizing combustion gas blow-by to minimize unacceptable exhaust emissions without costly and extensive machining operations and other additional manufacturing steps.

Additionally, it is known that it is critical to provide a means by which lubricating and cooling oil removed by a lowermost third sealing ring during the movements of the piston can be immediately returned to the engine crankcase by way of the cylinder bore and through certain configurations and/or other geometric modifications in and of the nominally cylindrical piston body as described below. Accordingly, there is a need for a piston that facilitates the passage of the foregoing oil to the cylinder bore and thence the engine crankcase after it is wiped and/or scraped from the cylinder wall.

Additionally, current piston designs have problems incorporating an integral reservoir for cooling oil into the piston crown area with adequate volume and highly consistent piston-to-piston volume, without the incorporation of separate sealing dams or rings that are mechanically attached to the piston in various manners, all of which require additional machining and manufacturing steps to prepare the piston to accept the separate sealing dams or rings, the inserting and fixing of the sealing rings in the manufacturing process, and the separate manufacture of the sealing dams or rings themselves.

Further, current piston designs also have problems with mechanical failure of the cooling oil reservoir dams or rings and/or the failure of the fixing means of such devices to the piston, causing physical separation from the piston and the resulting loss of cooling oil in one or more pistons and introduction of foreign materials into the interior of the engine and subsequent severe engine damage or failure therefore mandating the construction of a friction welded or otherwise joined upper and lower piston components to form an integral oil cooling reservoir.

The absence of adequate mechanical support of the piston to cylinder bore sealing ring area of typical pistons including, but not limited to, the flexure of the lower parts of the sealing ring areas often results in cracking and failure of the areas of the piston that incorporate the sealing rings and result in severe engine damage or failure. Also, the absence of adequate mechanical support of the sealing ring area of typical pistons results in the reduction and/or loss of sealing ring performance that causes gas blow-by, which leads to lubricating oil infiltration into the combustion chamber and therefore increased exhaust emissions and/or the mechanical failure of the sealing rings and severe engine damage or failure.

Additionally, in the matter of designing diesel engines to produce more power for a given displacement, significant reduction in engine dimensions, including, but not limited to, reduction in overall height which may, in turn, require a reduction in piston height. Production of more power for a given displacement may also significantly affect installation and packaging considerations, and the operating stresses on such engines and its piston components have materially increased.

These design and manufacturing requirements have resulted in the need for producing a piston comprised of upper and lower parts which may be friction welded together, and by virtue of such construction must have a significantly reduced dimension by way of the distance between the centerline of the piston connecting pin and the upper surfaces of the piston crown.

Concurrently, an advantage in operation and emission performance can be achieved by a reduction in the dimension between the upper surface of the piston crown and upper surface of the highest adjacent one of a plurality of sealing rings to reduce the amount of gasses in the combustion chamber residing between the top surface of said sealing ring and the combustion chamber, and therefore reduce the operating temperature of the piston and ring assembly and enhance the combustion process by minimizing non-combustible gases in the combustion process.

Additionally, in other applications of friction welding of piston sub-components there are conditions associated with the achievement of a sound welded joint in such applications where the reduction in the distance between the pin bore and the piston crown in the discrete upper and lower parts also results in the reduction and restriction of the space surrounding the welded joint available for accommodating and managing the ejectment of excess material generated by and resulting from the welding process (generically referred to as "flash" or "weld flash")

If the necessary provisions for accommodation and management of the weld flash in the restricted dimensions of the welded joint area are not made or are ineffective, the weld joint will be impaired including but not limited to incomplete welds, welds with voids and inclusions, welds which are compromised due to adherence of material ejected from the weld join to the surfaces of the piston adjacent to the weld, and/or welds that do not achieve design strength for the reasons including but not limited to those described herein To produce a piston that has one or more of the foregoing characteristics friction welding is employed; and it is also known in the art to friction weld two or more separate parts of a piston together to permit various configurations to be made that would otherwise be commercially impractical or impossible.

Known two-piece friction welded pistons also incorporate a cooling oil reservoir which can consist of a recess in the piston crown and the skirt formed after joining the separate pieces by welding, wherein the reservoirs communicate with oil spray jets located in the engine block to introduce cooling oil to the underside of the piston crown to reduce the operating temperature of the crown and thus prolong piston life and ensure proper operation of the piston to cylinder bore sealing rings.

Additionally, in the adaptation of a friction welded piston with a reduced height, maintaining an adequate volume of cooling oil while maintaining adequate strength of the ring support areas of the piston requires careful control of the cross section and wall thickness of such areas in connection with the other related dimensions of the piston and control of the overall weight of the piston.

Producing pistons which are rough-forged or rough-cast also require machining of the interior of the piston to obtain consistent dimensions of the inner wall cross section of the ring support area and otherwise to enable said pistons to have equal weights, equal volumes of the oil reservoirs, and consistent and adequate, but not excessive, thickness of the ring support areas.

Accordingly, there is a need for a piston that eliminates additional post-casting and/or post-forging machining that incorporates and/or affixes separate oil reservoirs sealing dams, and which further has a need for eliminating post-casting machining of contact or joining surfaces prior to a spin or friction welding process for joining at least two separate pieces of a piston, and further satisfying the requirement of locating the piston pin bore axis and the uppermost ring groove as close to the upper surface of the crown as possible.

Accordingly, there is a need for a piston that eliminates additional post-casting machining that incorporates and/or affixes separate oil reservoir sealing dams which further has a need for eliminating post-casting machining of contact or joining surfaces prior to a friction welding process for joining at least two separate pieces of a piston, and further satisfying the requirement of locating the uppermost sealing ring as close to the upper surface of the crown as possible.

Additionally, the elimination of post-casting or post-forging machining of the weld joining surfaces further ensures that the as-welded joint is vertically positioned in such a manner that the distance between the piston crown and piston pin remains within the design dimensions without additional machining operations.

Accordingly, there is a need for a piston that eliminates additional post-casting machining that incorporates and/or affixes separate oil reservoir sealing dams which further has a need for eliminating post-casting machining of contact or joining surfaces prior to a friction welding process for joining at least two separate pieces of a piston; such that problems have arisen in the location, configuration, and surface condition of the surfaces upon which the friction welding must occur, and further, the satisfaction of the requirements for the avoidance of incomplete fusion of the welded joint, excess weld flash, weld flash retention in lieu of ejection, flash adherence to adjacent surfaces, flash detachment or tearing and further difficulties in obtaining consistent welded joints in a series production manufacturing environment.

Accordingly, there is a need for a piston that provides a pathway for the lubricating oil removed from the cylinder walls by the movement of the piston by way of one or more multi-arcuate vertical cross-sections which creates a gap between the nominally cylindrical body and an associated cylinder wall enabling a quantity of oil to pass from an annular region beneath the ring groove between the cylindrical body and the associated cylinder wall to an area adjacent one of the pair of opposing surfaces.

BRIEF SUMMARY

According to one aspect of the present disclosure, a piston for use in an internal combustion engine is provided. The piston includes an upper member that further includes a crown located at a top surface of the upper member. The upper member also includes a combustion surface extending radially inward from the crown. The upper member further includes a first upper connecting surface integrally formed on a bottom side of the upper member, where the first upper connecting surface is downwardly directed. The upper member still further includes a second upper connecting surface integrally formed on the bottom side of the upper member, wherein the second upper connecting surface is downwardly directed. The first and second upper connecting surfaces are concentrically oriented, and at least one of the upper connecting surfaces includes a curvilinear and/or multi-arcuate cross-sectional profile between a root portion of the at least one upper connecting surfaces and a lowest portion of the at least one upper connecting surfaces. The piston still further includes a lower member that further includes a pair of opposing skirts. Each skirt defines a bore formed therethrough, said bore having a bore centerline. The lower member also includes a first lower connecting surface integrally formed on a top side of the lower member. The first lower connecting surface is upwardly directed, and a second lower connecting surface is integrally formed on a top side of the lower member. The second lower connecting surface is upwardly directed, and the first and second lower connecting surfaces are concentrically oriented. The lower member is integrally connected to the upper member by friction welding such that the first upper connecting surface and the first lower connecting surface form a first welded joint therebetween and the second upper connecting surface and the second lower connecting surface form a second welded joint therebetween. The curvilinear and/or multi-arcuate cross-section enables a reduced distance between the top surface of the crown and the bore centerline of the bore.

According to another aspect of the present disclosure, a piston is provided. The piston includes an upper member comprising a casting that is precision cast to net dimensions. The upper member includes a crown located at a top surface of the upper member. The upper member also includes a combustion surface extending radially inward from the crown. The upper member further includes a first upper connecting surface integrally formed on a bottom side of the upper member, wherein the first upper connecting surface is downwardly directed. The upper member still further includes a second upper connecting surface integrally formed on the bottom side of the upper member, wherein the second upper connecting surface is downwardly directed. The first and second upper connecting surfaces are concentrically oriented, and at least one of the upper connecting surfaces includes a curvilinear and/or multi-arcuate cross-sectional profile between a root portion of the at least one upper connecting surfaces and a lowest portion of the at least one upper connecting surfaces. The piston includes a lower member comprising a casting that is precision cast to net dimensions. The lower member includes a pair of opposing skirts, each skirt defines a bore formed therethrough. The bore has a bore centerline. The lower member also includes a first lower connecting surface integrally formed on a top side of the lower member, wherein the first lower connecting surface is upwardly directed. The lower member further includes a second lower connecting surface integrally formed on a top side of the lower member, wherein the second lower connecting surface is upwardly directed. The first and second lower connecting surfaces are concentrically oriented. The lower member is integrally connected to the upper member by friction welding such that the first upper connecting surface and the first lower connecting surface form a first welded joint therebetween and the second upper connecting surface and the second lower connecting surface form a second welded joint therebetween. The curvilinear and/or multi-arcuate profile is configured to control, direct and/or limit an amount of friction welding flash that may occupy space within the integral cooling oil reservoir.

According to another aspect of the present disclosure, a piston for use in an internal combustion engine is provided. The piston includes a forged upper member, wherein the upper member includes a combustion surface located at a lower elevation than a top surface of the upper member. The upper member also includes at least two concentrically positioned upper connecting surfaces spaced vertically apart from the combustion surface. The at least two upper connecting surfaces have a curvilinear or arcuate cross-section formed on a downwardly-directed portion thereof. The piston also includes a forged lower member that includes a pair of bores formed through the lower member for receiving a connecting rod pin. The lower member includes at least two concentrically positioned lower connecting surfaces. The least two lower connecting surfaces have a curvilinear or arcuate cross-section formed on an upwardly-directed portion thereof. The lower member is attached to the upper member by way of friction welding such that each of the at least two upper connecting surfaces of the upper member forms a welded joint with one of the at least two lower connecting surfaces.

According to another aspect of the present disclosure, a method of manufacturing a piston is provided. The method includes the step of precision casting to net final dimensions an upper member. The upper member includes a combustion surface and at least two upper connecting surfaces concentrically arranged and spaced vertically apart from the combustion surface. At least one of the upper connecting surfaces includes a curvilinear and/or multi-arcuate cross-sectional profile between a root portion of the at least one upper connecting surfaces and a lowest portion of the at least one upper connecting surfaces. The method also includes the step of precision casting to net final dimensions a lower member. The lower member includes a pair of opposing skirts having a bore formed through each of the skirts. The lower member also includes at least two lower connecting surfaces concentrically arranged. The method further includes the step of friction welding the lower member to the upper member. A welded joint is formed between each of the upper connecting surfaces of the upper member and a corresponding lower connecting surface of the lower member. The curvilinear and/or multi-arcuate profile is configured to control, direct and/or limit an amount of friction welding flash that may occupy space within the integral cooling oil reservoir. Additionally, the curvilinear and/or multi-arcuate cross-section is configured to reduce and/or eliminate an axial force urging apart the upper member and the lower member.

According to another aspect of the present disclosure, a method of manufacturing a piston is provided. The method includes the step of forging an upper member. The method also includes the step of forging a lower member. The method further includes the step of friction welding the lower member to the upper member. A welded joint is formed between each of the upper connecting surfaces of the upper member and a corresponding lower connecting surface of the lower member. The piston includes an upper member that further includes a crown located at a top surface of the upper member. The piston also includes a combustion surface extending radially inward from the crown. The piston further includes a first upper connecting surface integrally formed on a bottom side of the upper member wherein the first upper connecting surface is downwardly directed. The upper member also includes a second upper connecting surface integrally formed on the bottom side of the upper member, wherein the second upper connecting surface is downwardly directed. The first and second upper connecting surfaces are concentrically oriented, and at least one of the upper connecting surfaces includes a curvilinear and/or multi-arcuate cross-sectional profile between a root portion of the at least one upper connecting surfaces and a lowest portion of the at least one upper connecting surfaces. The piston still further includes a lower member that further includes a pair of opposing skirts. Each skirt defines a bore formed therethrough, each bore having a bore centerline. The lower member also includes a first lower connecting surface integrally formed on a top side of the lower member, wherein the first lower connecting surface is upwardly directed. The lower member further includes a second lower connecting surface integrally formed on a top side of the lower member. The second lower connecting surface is upwardly directed, and the first and second lower connecting surfaces are concentrically oriented. The lower member is integrally connected to the upper member by friction welding such that the first upper connecting surface and the first lower connecting surface form a first welded joint therebetween and the second upper connecting surface and the second lower connecting surface form a second welded joint therebetween. The curvilinear and/or multi-arcuate profile enables a reduced distance between the top surface of the crown and the bore centerline of the bore. The curvilinear and/or multi-arcuate profile is configured to control, direct and/or limit an amount of friction welding flash that may occupy space within the integral cooling oil reservoir. Additionally, the curvilinear and/or multi-arcuate cross-section is configured to reduce and/or eliminate an axial force urging apart said upper member and said lower member.

The advantages of the present disclosure will become more apparent to those skilled in the art from the following description of the embodiments of the disclosure which have been shown and described by way of illustration. As will be realized, the described devices and methods are capable of other and different embodiments, and their details are capable of modification in various respects.

BRIEF DESCRIPTION OF THE DRAWINGS

These and other features of the present disclosure, and their advantages, are illustrated specifically in embodiments of the disclosed devices and methods now to be described, by way of example, with reference to the accompanying diagrammatic drawings, in which.

Figure 1:
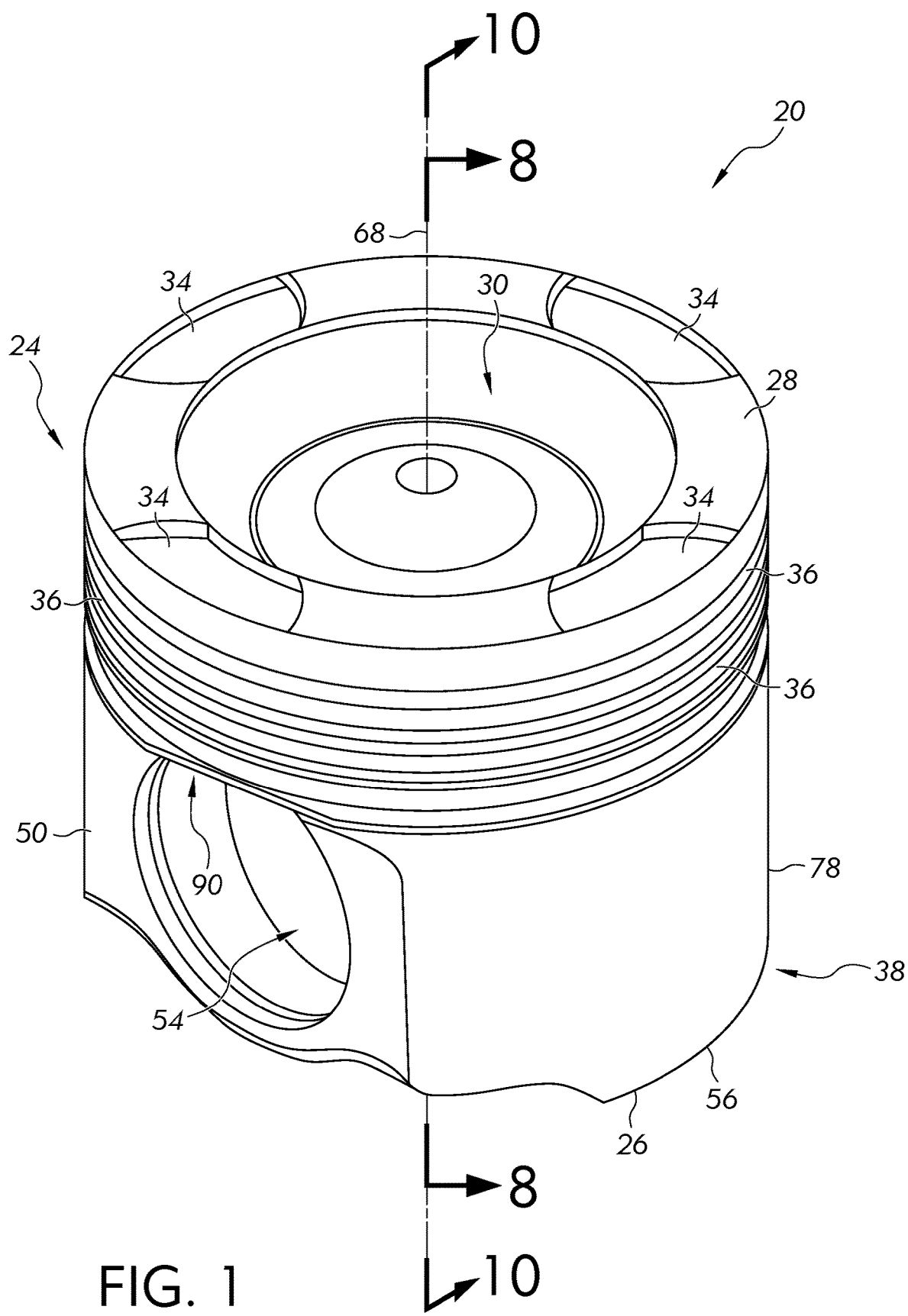
FIG. 1 is a top perspective of an embodiment of a completed two-piece friction-welded piston according to at least one embodiment of the present disclosure.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure.

For example, the terms "higher," "up," "lower," "down," and "below" refer to directions relative to the central axis of a piston. The terms higher and up are intended to indicate a position on the piston closer to a crown of the piston. The terms lower, down, and below are intended to indicate a position closer to the opposite end of the piston from the crown. Additionally, the term "vertical cross-section" indicates a cross section of the piston along a plane that is parallel or co-planar with the central axis of the piston. "Horizontal cross section" indicates a cross section of the piston along a plane that is transverse (e.g. 90°) to the central axis of the piston. Still further, in the drawings, the same reference numerals are employed for designating the same elements.

Figure 2:
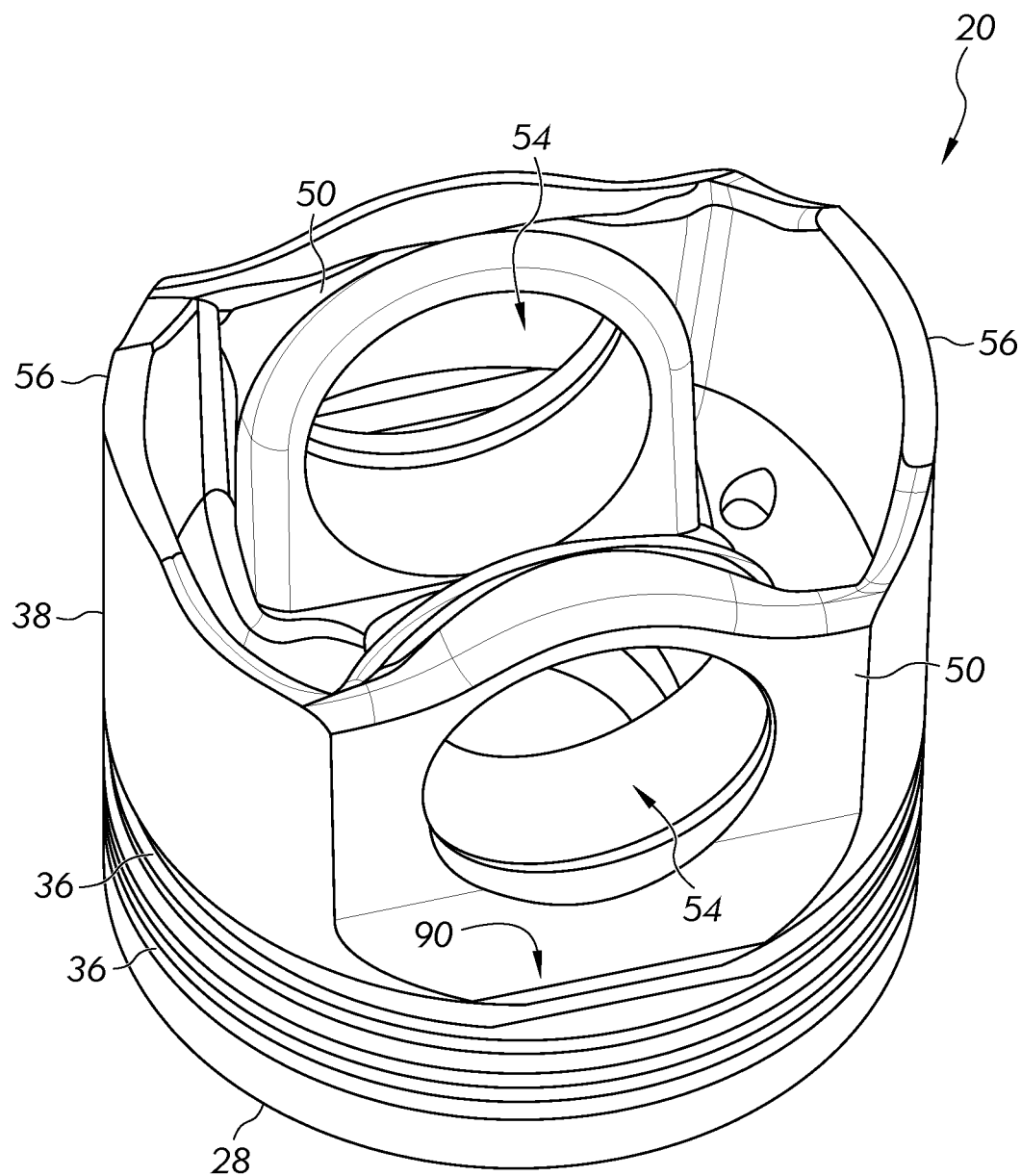
FIG. 2 is a bottom perspective of the piston shown in FIG. 1.
Figure 3:
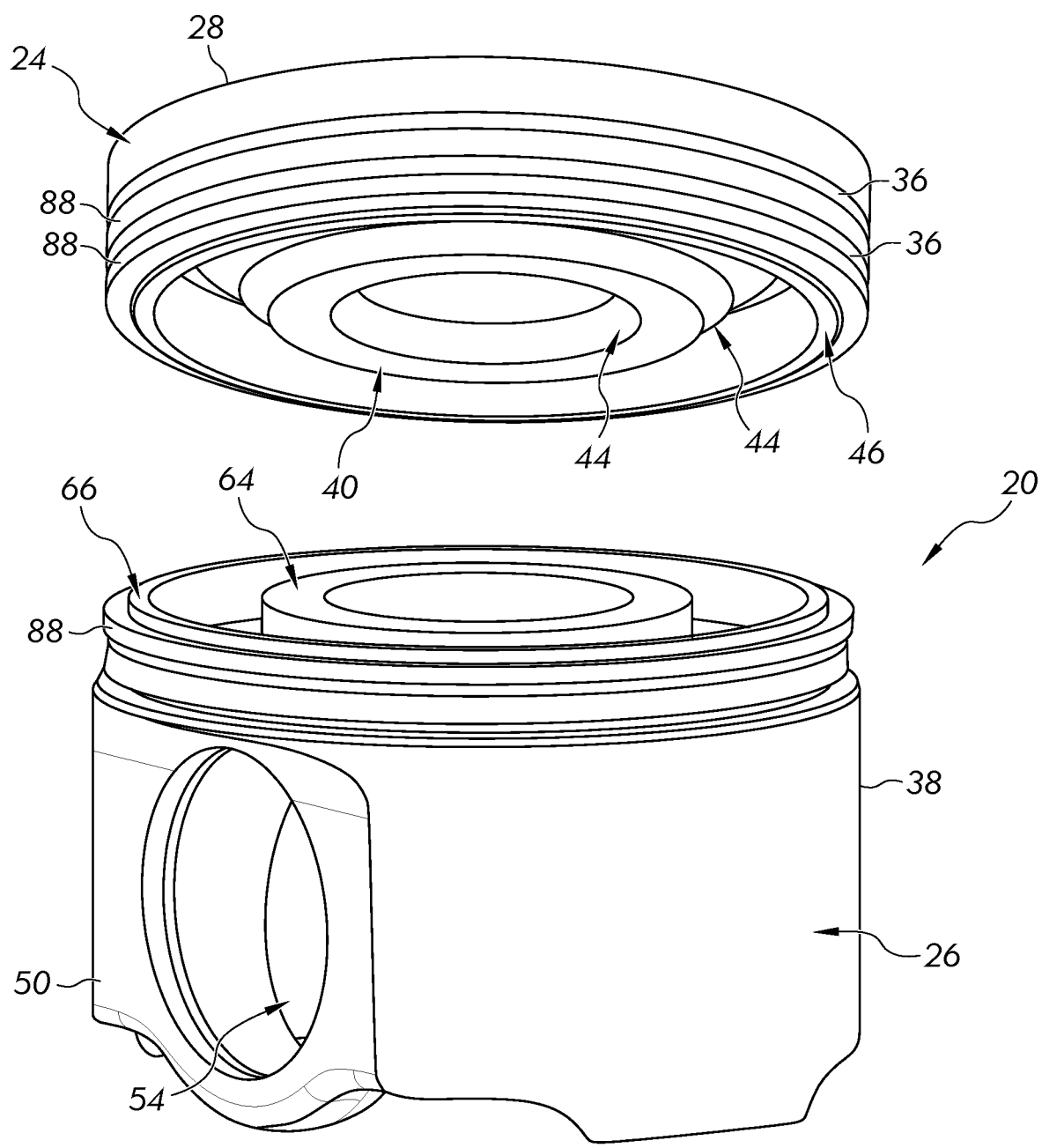
FIG. 3 is an oblique perspective view of an embodiment of upper and lower pieces of the two-piece friction-welded piston of FIG. 1 prior to joining by friction welding.

With reference to FIGS. 1 through 3, an embodiment of a two-piece friction-welded piston 20 is shown, wherein the piston includes an upper member 24 and a lower member 26. The upper member 24 of the piston 20 is a nominally cylindrical member that forms the upper portion of the piston 20. The piston 20 is positioned such that the upper member 24 forms the lower boundary of a combustion chamber within each combustion chamber of each cylinder of an engine (not shown). The upper member 24 includes a substantially flat crown 28 having a central recess 30, or combustion surface, extending radially inward therefrom. In an embodiment, the upper member 24 includes at least one detent 34 formed into the crown 28 to prevent contact between the crown 28 and any number of combustion air intake valve and exhaust valves (not shown) during operation. In the illustrated embodiment shown in FIG. 1, the crown 28 includes four (4) detents 34 formed therein, but it should be understood by one of ordinary skill in the art that any number of detents 34 can be formed into the crown 28 to prevent contact between the crown 28 and the exhaust or air intake valves. The upper member 24 further includes at least one circumferential groove 36 formed about the outer circumferential surface 38 thereof, wherein each of the grooves 36 is configured to receive a piston to cylinder bore sealing ring (not shown). In the illustrated embodiment, the upper member 24 includes at least two (2) grooves 36 formed into the outer circumferential surface 38. However, it should be understood by one of ordinary skill in the art that any number of grooves 36 can be formed into the outer circumferential surface 38 of the upper member 24.

Figure 4:
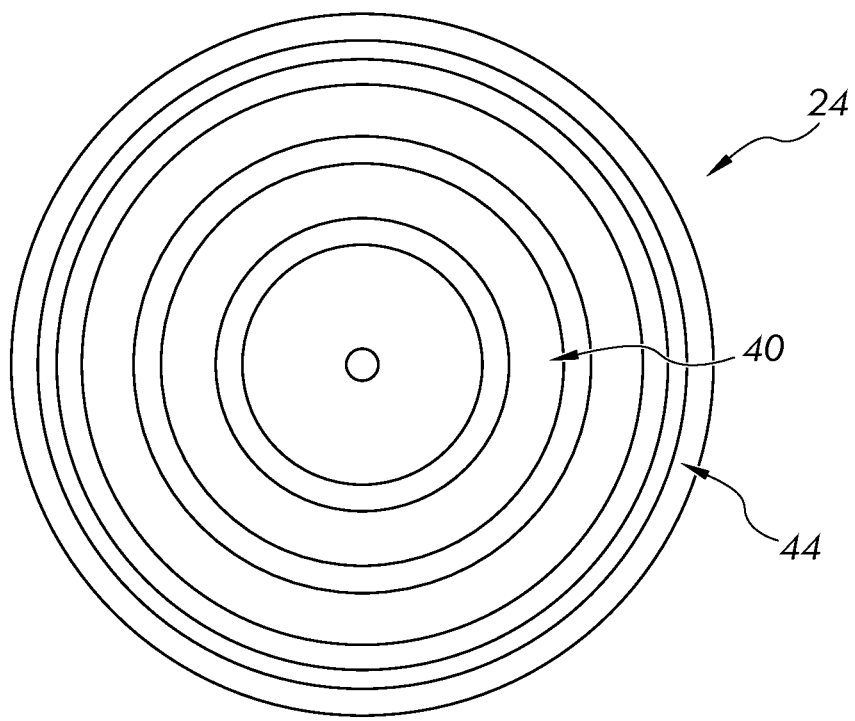
FIG. 4 is a bottom view of an embodiment of the upper member of the two-piece friction-welded piston of FIG. 1.
Figure 5:
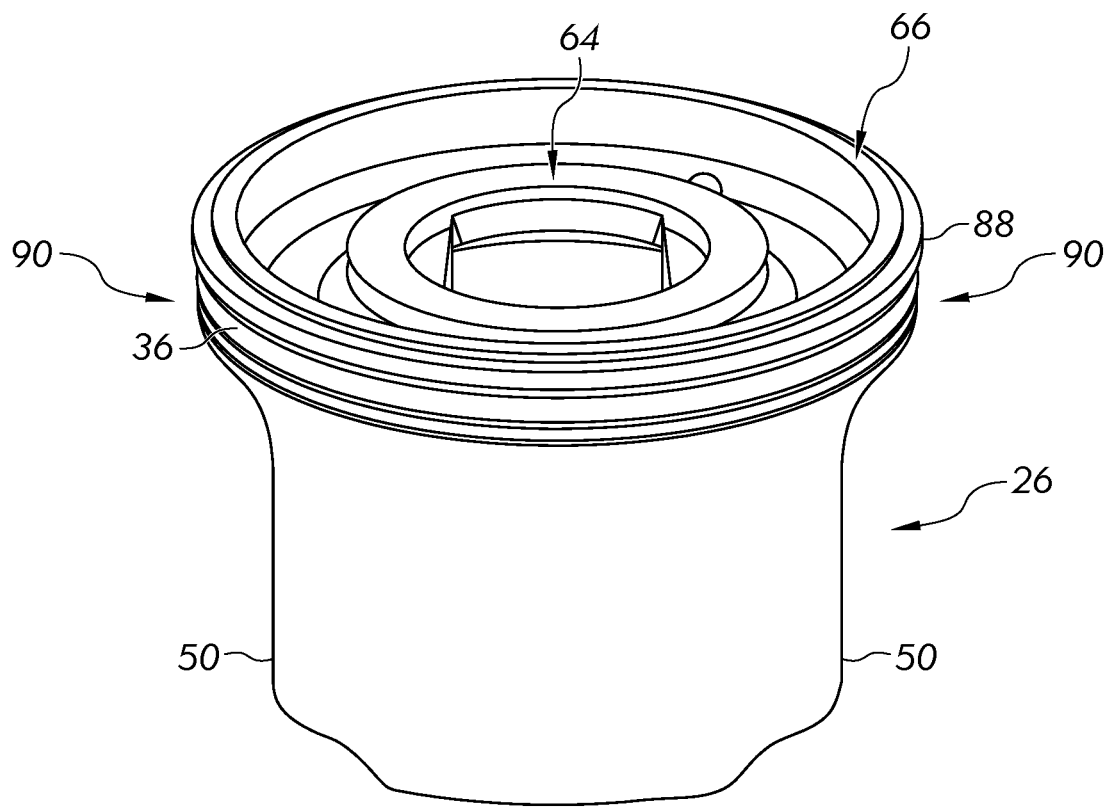
FIG. 5 is an oblique perspective view of the lower member of the piston shown in FIG. 1.

As shown in FIGS. 3 and 4, the first and second upper connecting surfaces 40, 46 are substantially concentrically aligned, wherein the first upper connecting surface 40 is positioned radially inward relative to the second upper connecting surface 46 of the upper member 24. Although the illustrated embodiment of the piston 20 will be explained below as having two connecting surfaces 40, 46 on the upper member 24 that mate with and correspond to two connecting surfaces on the lower member 26 by which the upper and lower members 24, 26 are joined together via friction welding, it should be understood by one of ordinary skill in the art that the upper and lower members 24, 26 can be configured to include any number of corresponding connecting surfaces for connecting the upper member 24 to the lower member 26. In an embodiment, the first and second upper connecting surfaces 40, 46 are oriented substantially parallel and are coplanar as shown in FIGS. 8 and 9.

Figure 10:
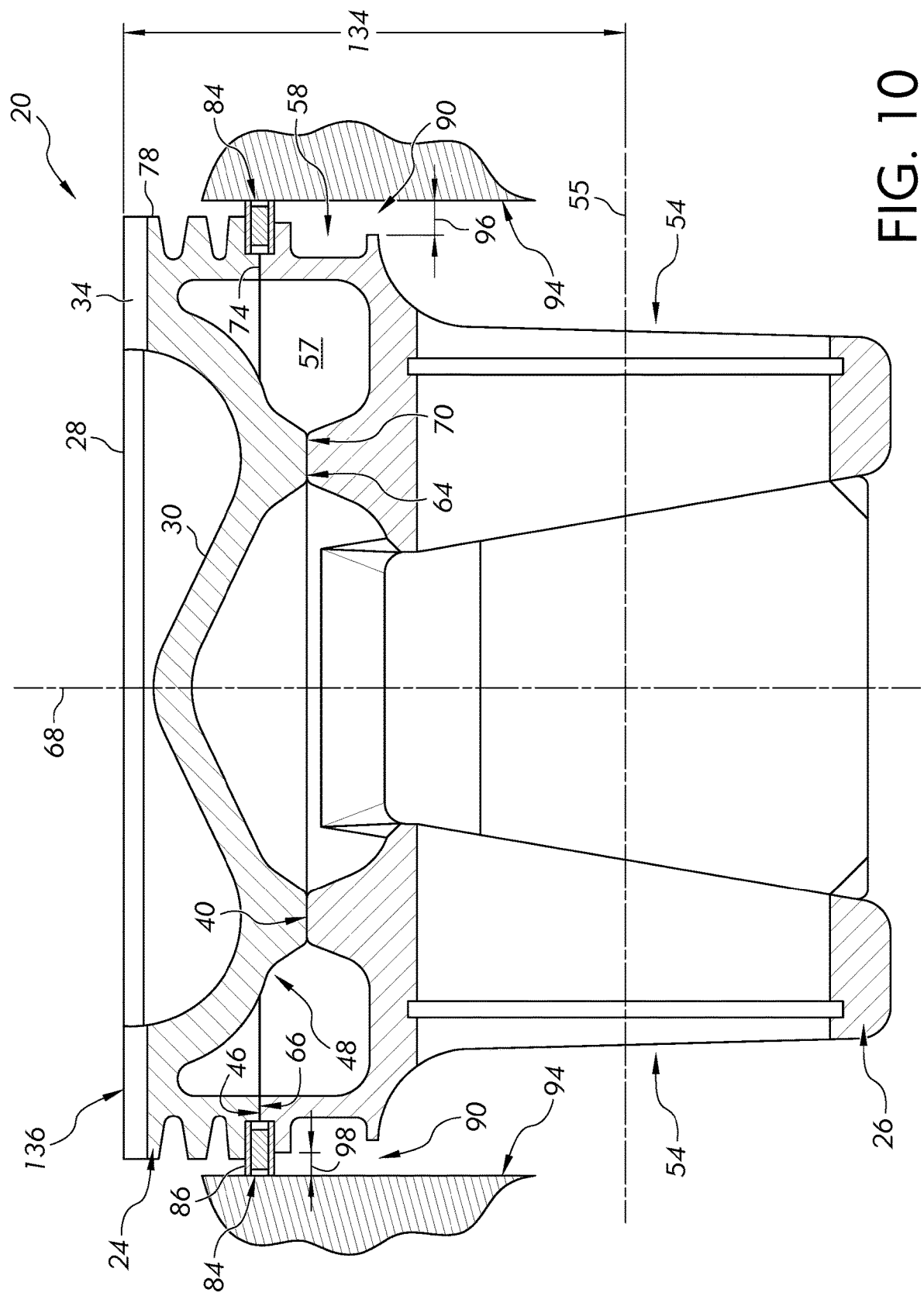
FIG. 10 is a cross-sectional view of the piston taken along the line 10-10 in FIG. 1.

In another example, at least one of the first or second upper connecting surfaces 40, 46 are parallel with respect to the crown 28 of the upper member 24 but are non-coplanar as shown in FIG. 10. However, in each such example, the first upper connecting surface 40 has a reduced height curvilinear and/or arcuate cross-section 44 and a second upper connecting surface 46 which may also have a reduced height curvilinear or arcuate cross-section 48 formed on the downwardly-directed portion thereof that will be discussed in greater detail below.

Figure 6:
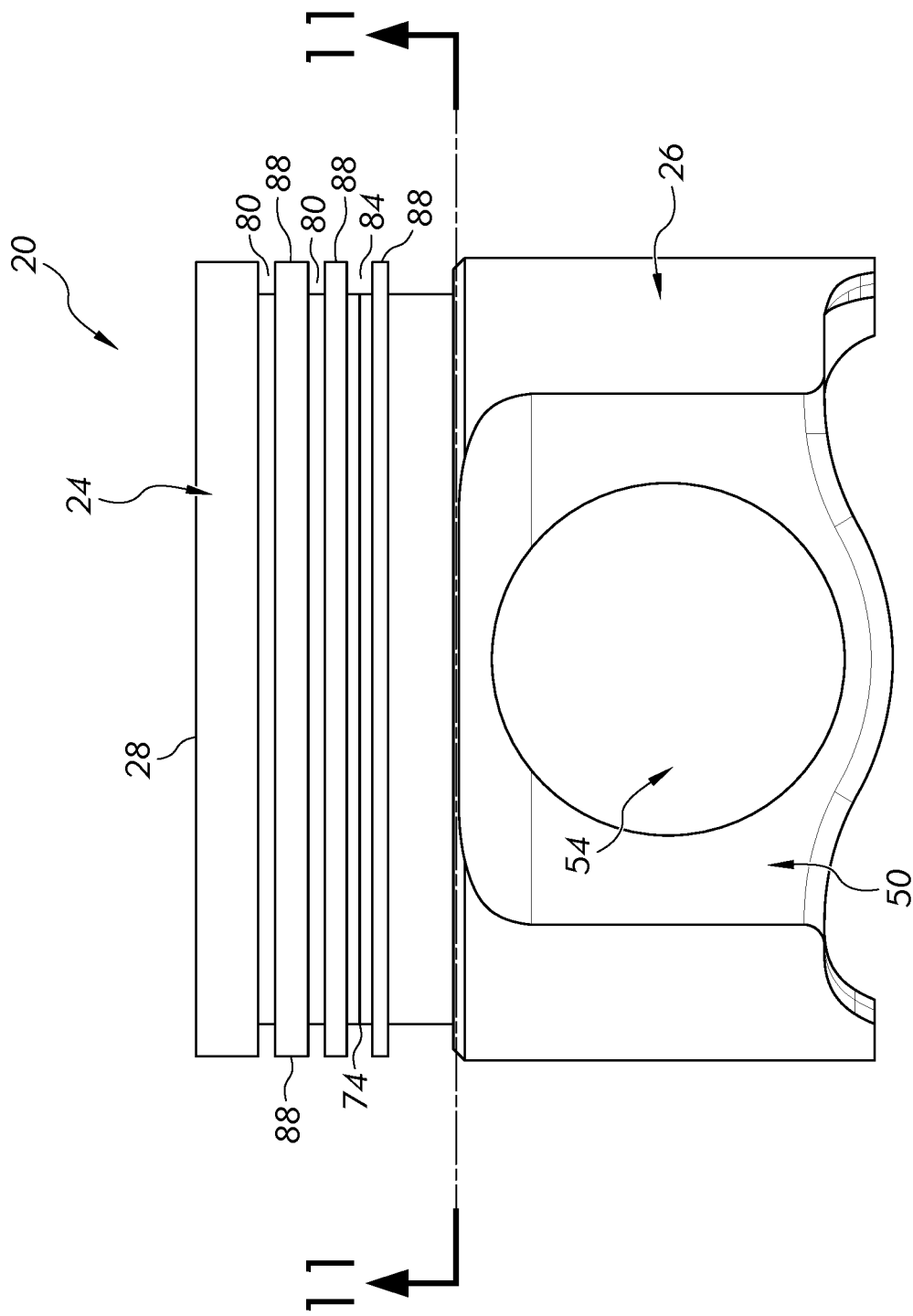
FIG. 6 is a side view of the piston shown in FIG. 1
Figure 7:
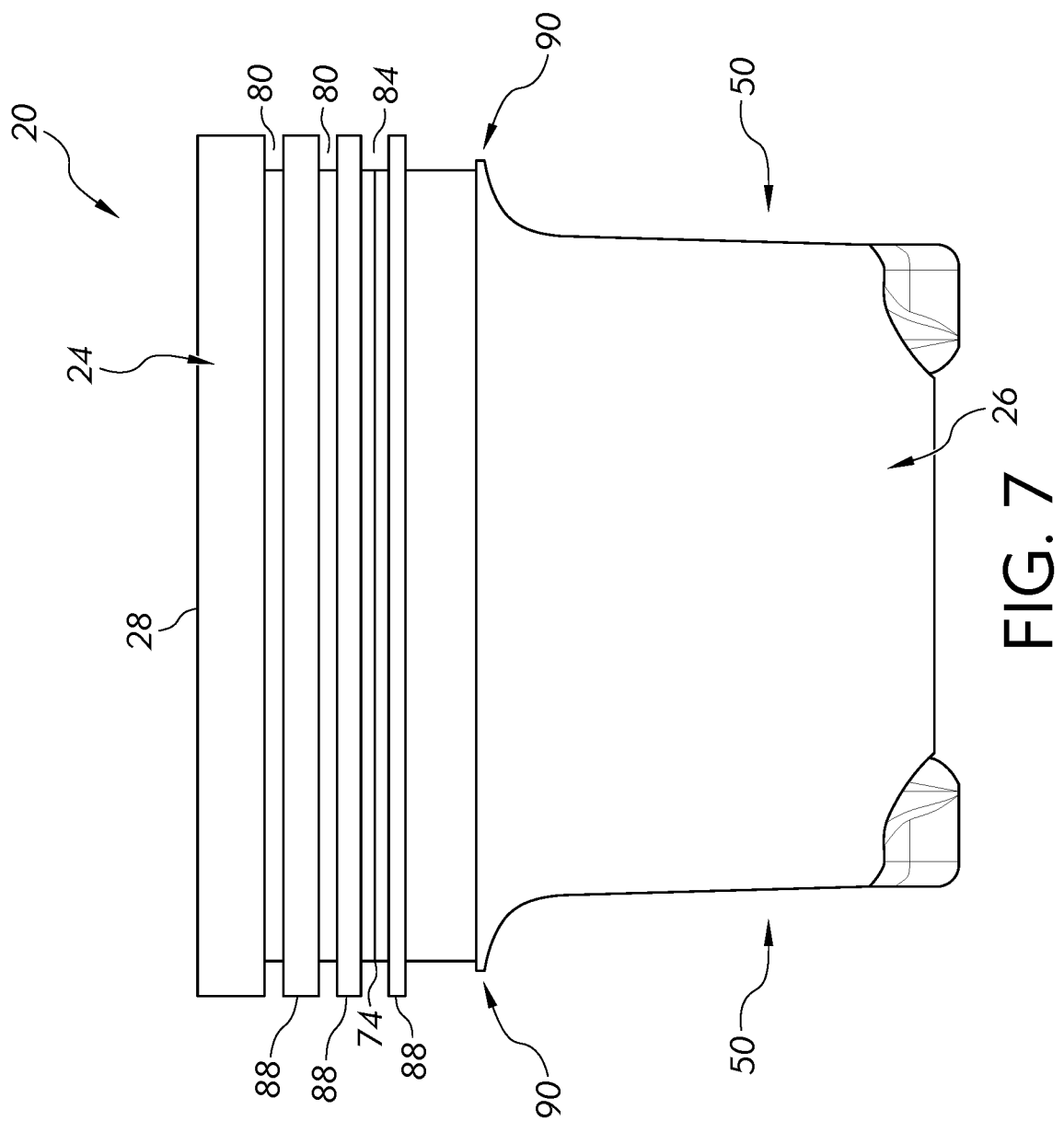
FIG. 7 is similar to FIG. 6, rotated 90 degrees relative to the view shown in FIG. 6.
Figure 8:
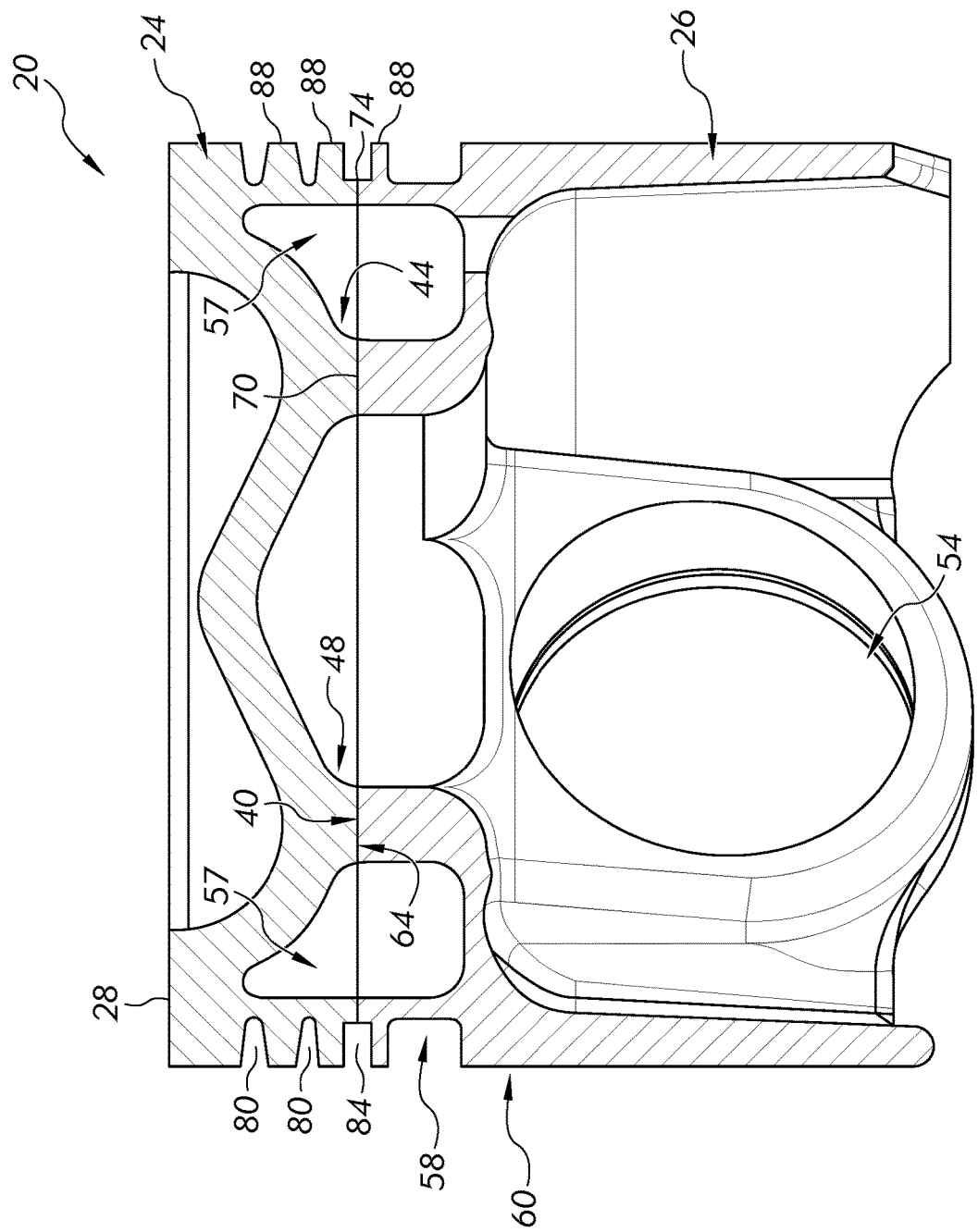
FIG. 8 is an oblique cross-sectional view of the piston, taken along the line 8-8 in FIG. 1.
Figure 9:
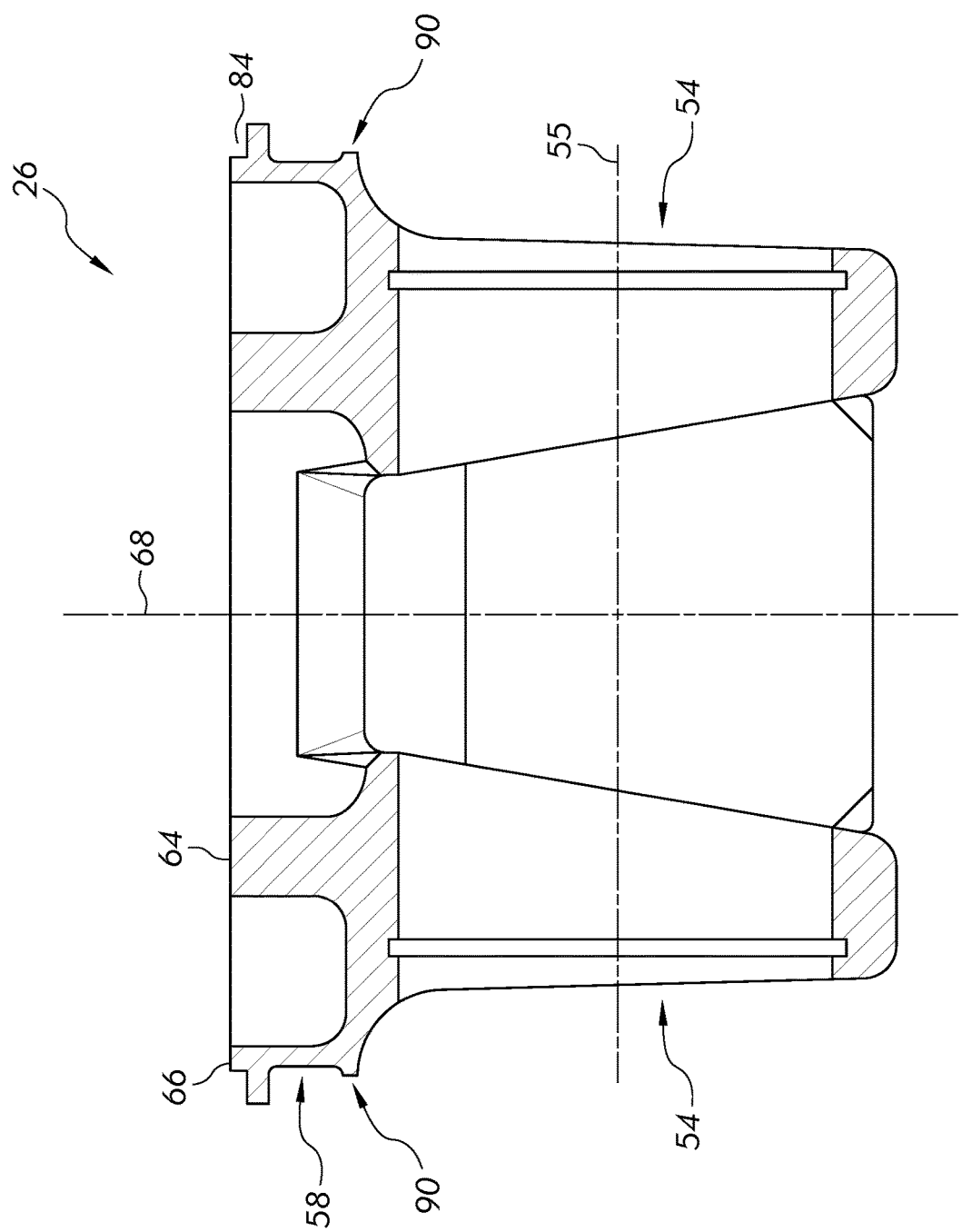
FIG. 9 is a cross-sectional view of the bottom member of the two-piece friction-welded piston taken along the line 10-10 of FIG. 1.

As shown in FIGS. 6, 7, and 8, the lower member 26 extends downwardly from the upper member 24. In one example, the piston 20 includes a truncated outer surface that forms a pair of opposing surfaces 50. The surfaces 50 are formed as substantially flat portions of the outer circumferential surface of the piston 20, and the surfaces 50 are substantially aligned in a parallel to one another and can be equidistant from the axial centerline 68. Each surface 50 defines a bore 54 formed through the lower member 26. The bore 54 includes an axis 55 (best seen in FIG. 9) perpendicular to the axial centerline 68 of the piston 20. The bore 54 is configured to cooperate with a connecting rod pin (not shown) for allowing the piston 20 to be operatively connected to the connecting rod (not shown) that translates the piston 20 within the combustion cylinder of an engine (not shown).

Along the outer perimeter of the piston 20 between the surfaces 50 are nominally arcuate radial section of a cylindrical surface which act as diametrically opposing skirts. In one example, two skirt portions oppose each other and are located between the flat surfaces 50. The portions 56 of the piston 20 cylindrically extending between each of the skirts form the outer boundary of an integral cooling reservoir 57 (best seen in FIG. 8).

The lower member 26 also includes at least one groove 58 formed into the outer cylindrical surface 60 thereof, as shown in FIGS. 8, 9, and 10. In the illustrated exemplary embodiment, the lower member 26 includes at least two (2) circumferential grooves 58 formed therein. In an embodiment, the lower member 26 includes a first lower connecting surface 64 and a second lower connecting surface 66 formed on the upwardly-directed portion thereof, as shown in FIGS. 3, 8, 9, and 10. The first and second lower connecting surfaces 64, 66 are substantially concentrically aligned and perpendicular to the axial centerline 68, wherein the first lower connecting surface 64 is positioned radially inward relative to the second lower connecting surface 66 of the lower member 26.

In a further example, as shown in FIGS. 8 and 9, the upper and lower members 24, 26 of the piston 20 are configured such that the first and second upper connecting surfaces 40, 46 are coplanar and the first and second lower connecting surfaces 64, 66 are similarly coplanar. As such, when the upper member 24 is connected to the lower member 26, the resulting joints between the upper member 24 and the lower member 26 are likewise substantially coplanar. In another exemplary embodiment, as shown in FIG. 10, the first upper connecting surface 40 is positioned a greater distance away from the crown 28 than the second upper connecting surface 46 such that the first and second upper connecting surfaces 40, 46 are non-coplanar. In a like manner, the first lower connecting surface 64 is offset from the second lower connecting surface 66 the same relative distance that the first and second upper connecting surfaces 40, 46 are offset.

Although the embodiment illustrated in FIG. 10 shows that the first upper connecting surface 40 is spaced apart from the crown 28 a greater distance than the second upper connecting surface 46, it should be understood by one of ordinary skill in the art that the first upper connecting surface 40 can also be spaced apart from the crown 28 a lesser distance than the second upper connecting surface 46. The same relative spacing and offsets apply equally to the first and second lower connecting surfaces 64, 66 in a corresponding manner to ensure coincident contact between the upper connecting surfaces 40, 46 and the lower connecting surfaces 64, 66 during a friction-welding process. However, in each such embodiment, the first upper connecting surface 40 has a reduced height curvilinear and/or arcuate cross-section 44 and a second upper connecting surface 46 which may also have a reduced height curvilinear and/or arcuate cross-section 48 formed on the downwardly-directed portion thereof that will be described in greater detail below.

The upper and lower members 24, 26 are formed separately and later joined together to form the complete piston 20. In an embodiment, the upper and lower members 24, 26 are formed using steel, other ferrous material or other high temperature/high strength metals such as titanium, Monel, Inconel, or similar. The material used for the upper and lower members 24, 26 should be of adequate strength and have sufficient heat resistance to impart the needed strength for use in a diesel or other internal combustion engines.

Any combination of the upper and lower members 24, 26 can be precision cast to net final dimensions. Precision cast to net final dimensions generally means that the final cast piece does not require additional machining to any of the upper connecting surfaces 40, 46 or lower connecting surfaces 64, 66 prior to joining the upper and lower members 24, 26 in a friction or inertial welding process. Also, by precision casting to net final dimensions, additional machining to form the surfaces of the integral cooling oil reservoir 57 is eliminated. In an embodiment, precision casting to net final dimensions of the upper and lower members 24, 26 means that the precision cast to net final dimension tolerance is between about +/−0.010 inches to about +/−0.020 inches. In another embodiment, precision casting to net final dimensions of the upper and lower members 24, 26 means that the first and second upper connecting surfaces 40, 46 and the first and second lower connecting surfaces 64, 66 have a surface finish roughness of less than about 125 Ra. Although post-casting machining may be performed on other surfaces of the upper and lower members 24, 26 for other reasons, the precision cast to net final dimensions of the first and second upper connecting surfaces 40, 46 and the first and second lower connecting surfaces 64, 66, and the interior of the internal oil cooling reservoir 57 requires no additional post-casting machining in order to friction weld the upper and lower members 24, 26 together; However, in each such embodiment, the first upper connecting surface 40 has a reduced height curvilinear and/or arcuate cross-section 44 and a second upper connecting surface 46 which may also have a reduced height curvilinear and/or arcuate cross-section 48 formed on the downwardly-directed portion thereof. While the remainder of the disclosure discusses the upper and lower members 24, 26 in terms of cast or precision cast to net final dimension components, the upper and lower members 24, 26 can be constructed of other suitable means as well. For example, each of the upper and lower members 24, 26 can also be forgings. Additionally, this disclosure also contemplates combinations of upper and lower members 24, 26 employing one forging and one precision cast member.

Assembly of the piston 20 includes joining the precision cast to net final dimension upper member 24 to the precision cast to net final dimension lower member 26 by way of friction welding or inertial welding in which the first and second upper connecting surfaces 40, 46 and the first and second lower connecting surfaces 64, 66 are not machined prior to the friction welding process. In an embodiment, both the upper and lower members 24, 26 are either rotated such that they rotate in opposing directions about the axial centerline 68 of the piston 20, or one is fixed and the other rotated with respect thereto. As one or more of the upper and lower members 24, 26 are rotated, the members are pushed together such that the first upper connecting surface 40 of the upper member 24 and the first lower connecting surface 64 of the lower member 26 as well as the second upper connecting surface 46 of the upper member 24 and the second lower connecting surface 66 of the lower member 26 contact each other, and additional pressing of the upper and lower members 24, 26 together causes a localized friction weld that integrally joins the upper member 24 to the lower member 26. Upon completion of the friction-welding process, the first upper connecting surface 40 and the first lower connecting surface 64 form a first welded joint 70, and the second upper connecting surface 46 and the second lower connecting surface 66 form a second welded joint 74. As explained above with respect to FIGS. 8 and 9, in an embodiment, the first welded joint 70 between the first upper and lower connecting surfaces 40, 64 and the second welded joint 74 between the second upper and lower connecting surfaces 46, 66 are substantially coplanar. Also as explained above with respect to FIG. 10, in another embodiment, the first welded joint 70 between the first upper and lower connecting surfaces 40, 64 and the second welded joint 74 between the second upper and lower connecting surfaces 46, 66 are vertically offset and non-coplanar.

Figure 11:
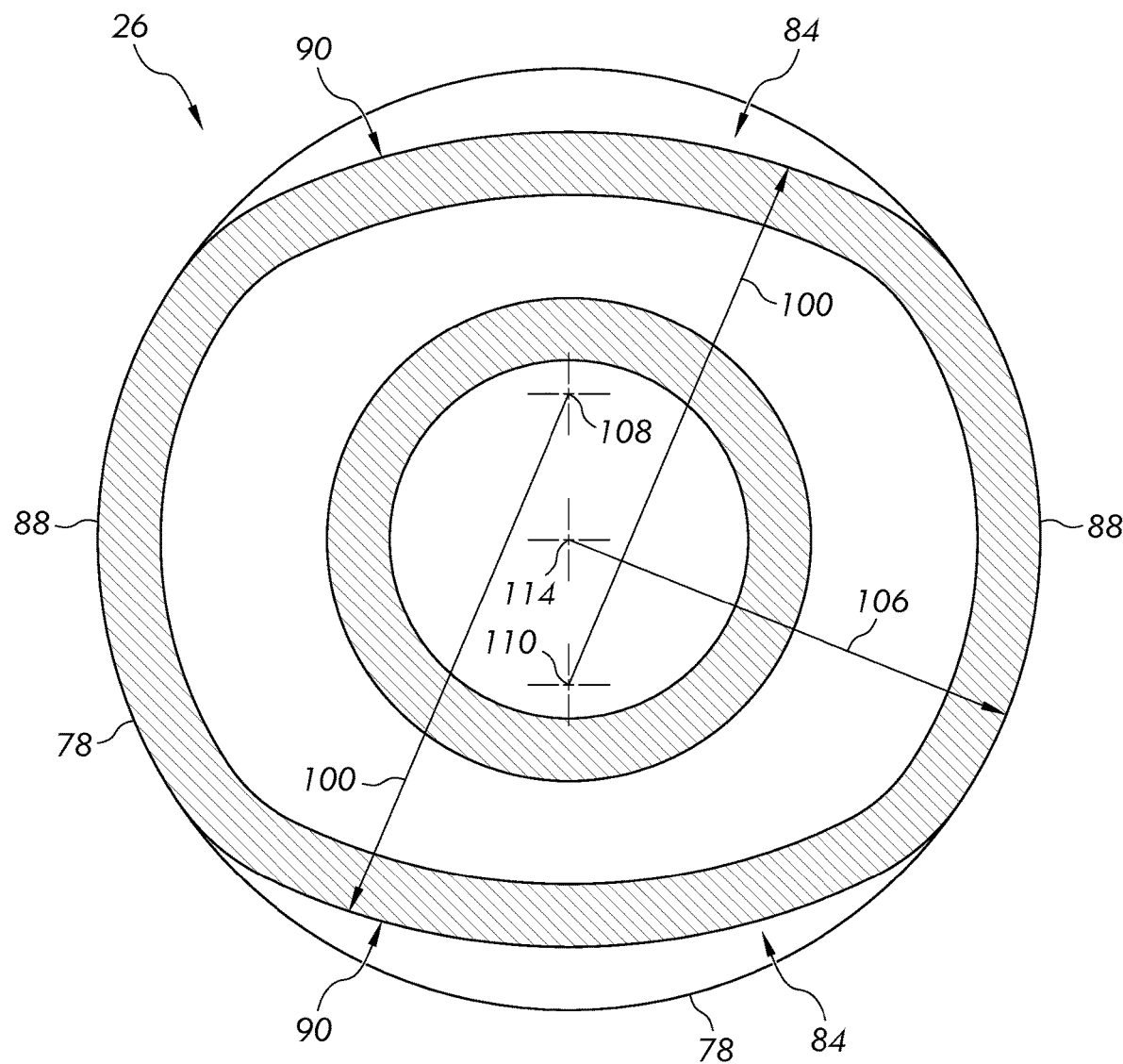
FIG. 11 is a cross-sectional view of the lower member taken along line 11-11 in FIG. 6 showing a multi-arcuate horizontal cross-section.

Turning to FIGS. 8, 10, and 11, an embodiment of a piston 20 is shown, wherein a portion of the piston 20 includes a multi-arcuate cross-section 76 which will be described in greater detail below. As previously described, the piston 20 includes a nominally cylindrical body 78 depending from the crown 28. The nominally cylindrical body 78 defines at least one circumferential groove 36 formed about the outer circumferential surface of the cylindrical body 78. In the illustrated embodiment, the piston 20 includes two (2) compression ring grooves 80 and one oil control ring groove 84 formed into the outer circumferential surface (best seen in FIG. 10). The compression ring grooves 80 are configured for use with piston sealing rings (not shown), and the oil control ring groove is configured for use with an oil control ring 86 (best seen in FIG. 10). However, it should be understood by one of ordinary skill in the art that other numbers of compression ring grooves 80 and oil control ring grooves 84 in various arrangements can be formed into the outer circumferential surface of the piston 20. Each of the ridges 88 between the grooves 80, 84 can be termed a "ring land" or a "piston land."

In the shown example, the top two compression ring grooves 80 cooperate with the piston sealing rings to form a seal between the combustion chamber and the crankcase of the engine (not shown). The goal is to prevent combustion gases from passing into the crankcase and prevent oil from passing into the combustion chamber. During the compression and power strokes, at least one of the piston sealing rings seals the combustion gases and reduces and/or prevents blow-by.

Additionally, the oil control ring groove 84 cooperates with the oil control ring 86 to control the oil that is introduced onto the cylinder walls by lubricating oil circulating in the engine and cooling oil injected into the piston crown and subsequently exiting into the engine crankcase. The oil control ring 86 scrapes the cylinder walls to return the scraped oil back toward the crankcase. One goal of the oil control ring 86 is to reduce and/or prevent oil passage between the face of the oil control ring 86 and the cylinder through the ring gap or pass behind the oil control ring 86. While not shown, the oil control ring 86 can include any number of structures, including multiple-piece rings used with an expander/spacer.

In another example, the multi-arcuate, horizontal cross-section 90 can be generally non-circular (e.g., ovoid) in shape. In other words, the perimeter of the multi-arcuate, horizontal cross-section 90 can be a figure constructed from two pairs of arcs, with two different radii. The arcs are joined at a point, in which lines tangential to both joining arcs lie on the same line, thus making the transition thereof continuous. Any point on the non-circular perimeter belongs to an arc with a constant radius (shorter or longer). In another example, multi-arcuate, horizontal cross-section 90 can be defined by a series of intersecting arcs. In yet another example, the multi-arcuate horizontal cross-section 90 can include elliptical portions, hyperbolic portions, parabolic portions, or even some straight lines. It is to be understood that other cross-section shapes and/or other similar shapes are also contemplated, so long as the horizontal cross-sectional shape creates the described passage 96 between the cylindrical body 78 and the associated cylinder wall 94 of the engine as shown in FIG. 10.

As shown in FIG. 11, a portion of the cylindrical body 78 defines one or more multi-arcuate, horizontal cross-section 90 below the oil control ring groove 84. As described above, one purpose of an oil control ring 86 is to "wipe" or remove a quantity of excess oil from an associated internal cylinder wall 94 as the piston 20 moves through a downward stroke. The oil is then returned to the other portions of the engine, which may include a crankcase and/or oil sump. The one or more multi-arcuate, horizontal cross-sections 90 create one or more passages 96 between the cylindrical body 78 and the associated cylinder wall 94 of an engine, thereby enabling a quantity of oil to more easily pass from an annular region 98 between the cylindrical body 78 and the associated cylinder wall 94 to one or more areas adjacent to the lower member 26. This enables the oil control ring 86 to more efficiently accomplish its task and move and/or remove a greater quantity of oil from the cylinder wall 94 and the annular region 98.

In one example, as shown in FIG. 11, the multi-arcuate horizontal cross-section 90 includes a radius 100 of the cylindrical portions 104 that is less than the radius 106 corresponding to the passage 96 portion of the multi-arcuate horizontal cross-section 90. In this example, the multi-arcuate horizontal cross-section 90 is defined by four arcs of constant radius, where one pair of arcs have equal radii that are different from the equal radii of the other pair of arcs. By definition, the two pairs of circular arcs have different center points 108, 110, 114. As shown, the radius 100 defines the multi-arcuate cross-section at the top and bottom of FIG. 11, while radius 106 defines the multi-arcuate cross-section to the right and left. Radius 100 is greater than radius 106, and the resulting arcs have different center points 108, 110, 114.

Figure 12:
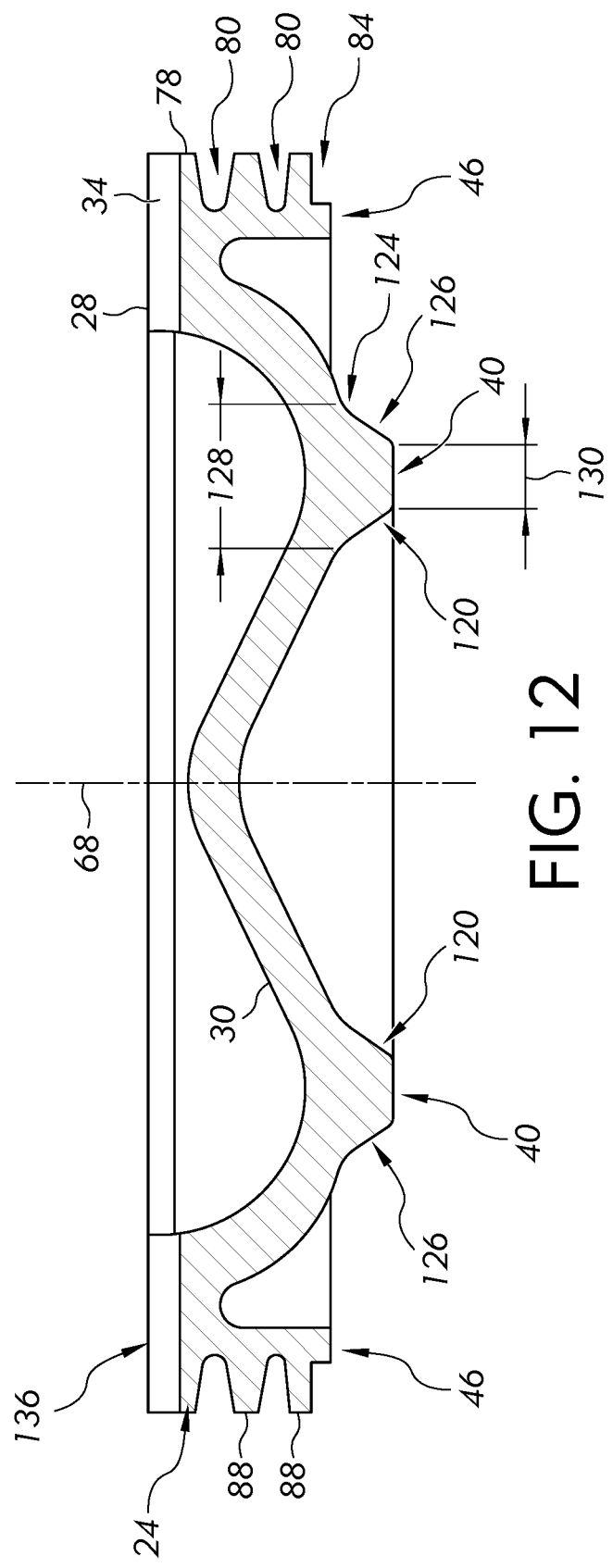
FIG. 12 is a cross-sectional view of the upper member taken along line 10-10 in FIG. 1 showing a curvilinear and/or arcuate cross-sectional profile on an upper connecting surface.
Figure 13:
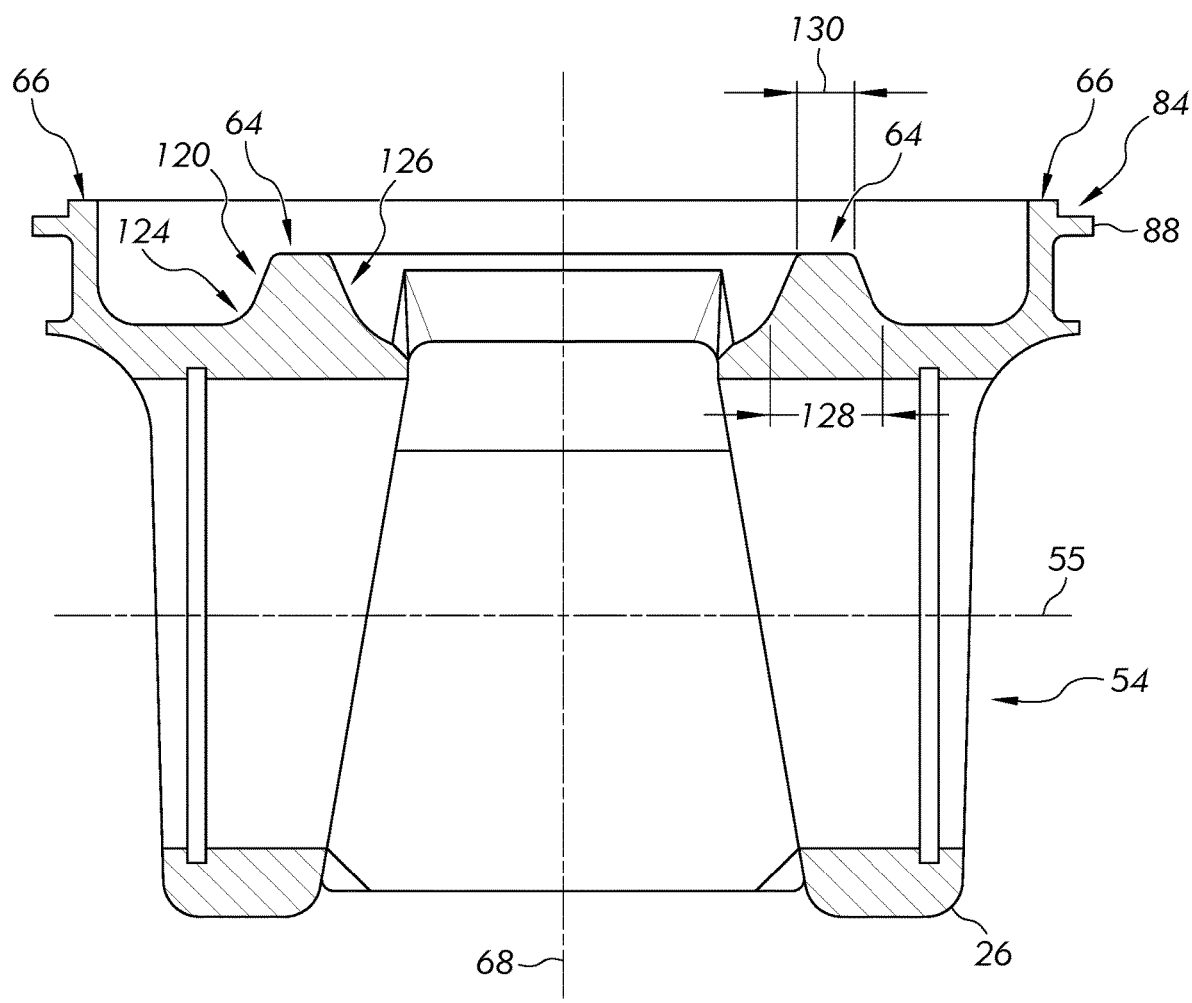
FIG. 13 is a cross-sectional view of the lower member taken along line 10-10 in FIG. 1 showing a curvilinear and/or arcuate cross-sectional profile on a lower connecting surface.

Turning to FIGS. 12 and 13, further features of the upper connecting surfaces 40, 46 and the lower connecting surfaces 64, 66 are now described. In one example, the first upper connecting surface 40 includes a curvilinear and/or multi-arcuate cross-sectional profile 120 between a root portion 124 of the first upper connecting surface 40 and a lowest portion 126 of the first upper connecting surface 40. This curvilinear and/or multi-arcuate cross-sectional profile 120 is the same as the previously noted reduced height arcuate cross-sections 44, 48. The curvilinear and/or multi-arcuate cross-sectional profile 120 or reduced height arcuate cross-sections 44, 48 can be formed of any suitable curved, arcuate, multi-arcuate, or curvilinear surfaces or any combination thereof.

Figure 14:
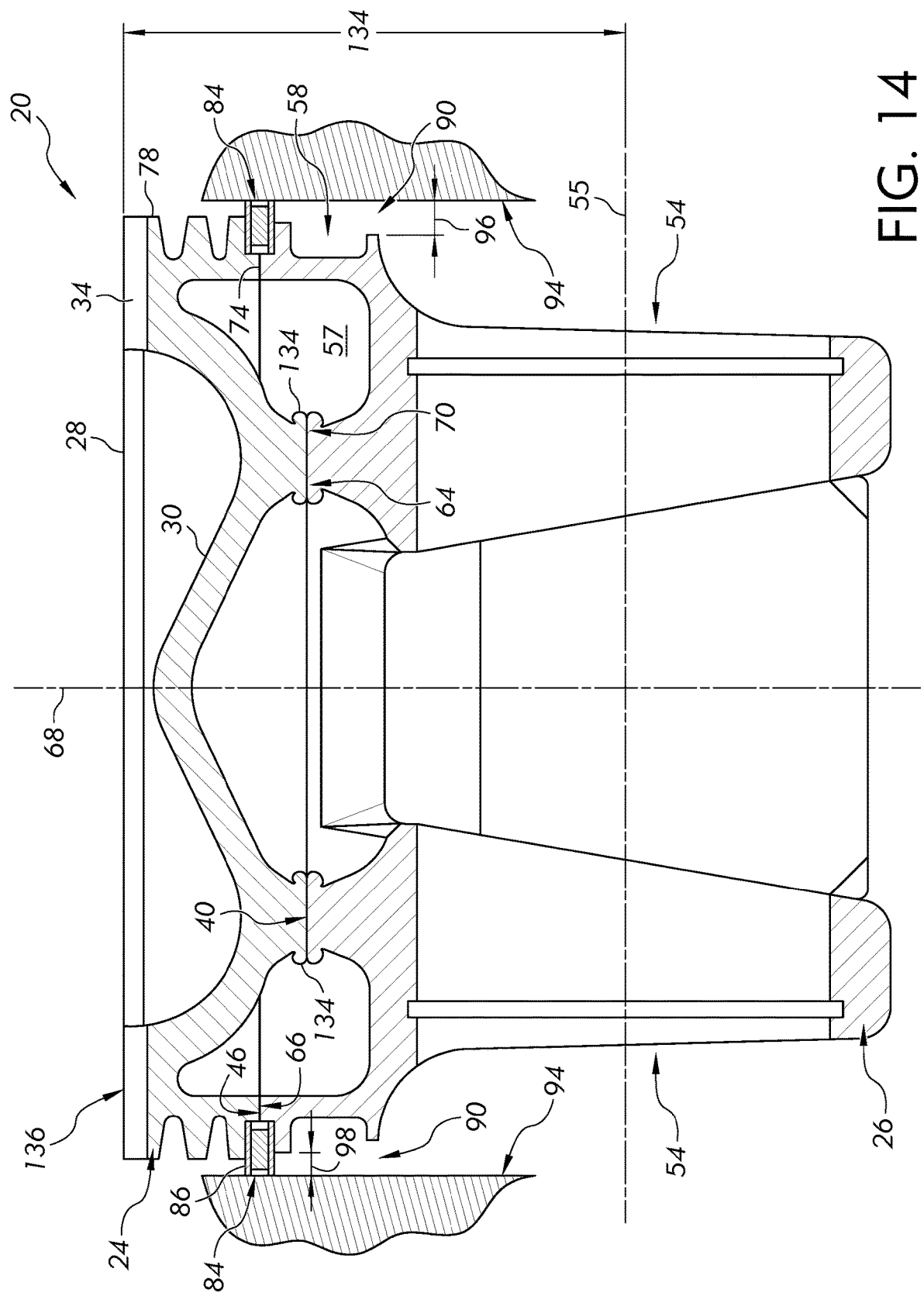
FIG. 14 is a cross-sectional view of the piston of FIG. 1, showing the lesser height of the upper connecting surface and the curvilinear and/or arcuate cross-sectional profile to provide a path for material ejected from the welded joint so as to not interfere in the welding process.

Regardless of the surfaces that make up the curvilinear and/or multi-arcuate cross-sectional profile 120, the curvilinear and/or multi-arcuate cross-sectional profile 120 does not include vertical or substantially vertical sides to the first upper connecting surface 40. This arrangement can be used to develop a first upper connecting surface 40 that has greater cross-sectional width 128 at the root portion 124 than the cross-sectional width 130 at the lowest portion 126. The greater width at the root portion can be beneficial in at least three ways. First, the curvilinear and/or multi-arcuate cross-sectional profile 120 enables a shortened distance 134 between a top surface 136 of the crown 28 and the bore centerline 55 of the bore 54 (best seen in FIG. 14). Secondly, the curvilinear and/or multi-arcuate cross-sectional profile 120 is configured to permit adequate space for the ejectment of friction welding flash 134 as seen in FIG. 14 that may occupy space within the integral cooling oil reservoir 57. In other words, connecting surfaces such as the first upper connecting surface 40 having a generally flat cross-sectional profile in known examples can undesirably occupy more space and include a greater amount of metal to create the friction welding flash 134 that will pass into the integral cooling oil reservoir 57 and the area between the weld and the axis 68 of the piston 20 thus accommodating the weld flash. The adoption of a curvilinear and/or multi-arcuate profile can shorten the height of the upper member 24 and thereby control and/or limit the amount of welding flash 134 passing away from the friction weld site.

In other examples, the curvilinear and/or multi-arcuate cross-sectional profile 120 can be included on any of the first upper connecting surface 40, the second upper connecting surface 46, the first lower connecting surface 64, the second lower connecting surface 66, or any combination of these surfaces.

Figure 15:
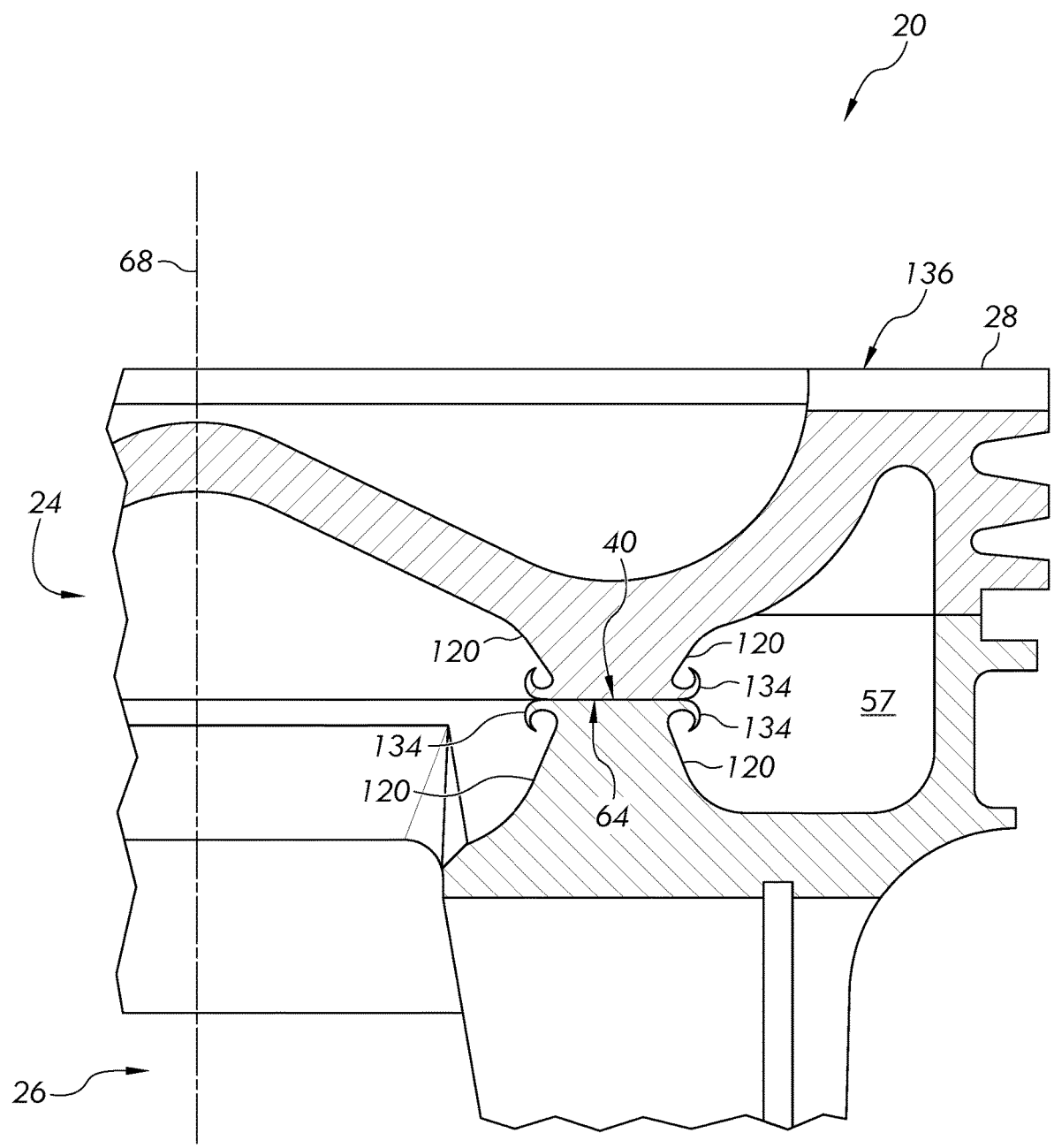
FIG. 15 is a detail view of an example upper connecting surface friction welded to a lower connecting surface and the ejectment path of weld flash.

Turning to FIG. 15, a detail view of an example friction welding site is shown, such as the first upper connecting surface 40 welded to the first lower connecting surface 64. As shown the curvilinear and/or multi-arcuate cross-sectional profile 120 enables the ejectment of the friction welding flash 134 to cooperate with the curvilinear and/or multi-arcuate cross-sectional profile 120 and be thereby directed away from the weld site. Ejectment of the friction welding flash 134 in this way enables the shortened distance 134 between a top surface 136 of the crown 28 and the bore centerline 55 of the bore 54 (best seen in FIG. 14) as was previously described. Another benefit of having this specific ejectment path is that the path can reduce and/or eliminate the potential for the friction welding flash 134 to curl around and come into contact with the piston portion at another location. In known examples of friction-welded pistons, this curl and contact can produce a spring effect wherein the friction welding flash can create an axial force generally directed parallel to the axial centerline 68 of the piston 20. This axial force can increase the potential for weakened and/or failed weld surfaces at the various connecting surfaces, as the described spring force urges the piston member axially away from the connecting surfaces. In some cases of prior art, this curl and contact can separate or otherwise impair the integrity of the friction weld. Alternatively, the curvilinear and/or multi-arcuate cross-sectional profile 120 can reduce and/or eliminate the potential for the friction welding flash 134 to curl around and come into contact with the piston member that can impair the integrity of the friction weld between piston members 24, 26.

Additionally, it is to be appreciated that the piston members 24, 26 can be constructed prior to friction welding using any suitable material and by any suitable process. For example, the piston members 24, 26 can be precision cast to near net dimension from steel. Other examples can include piston members 24, 26 made by forgings, or any other suitable method of construction. Other examples can include an upper member 24 and a lower member 26 comprising dissimilar metals.

Typical friction welded pistons which are made from two pieces consist of a steel cast or forged crown and a separate skirt, usually cast or forged of the same or a compatible steel alloy which guides the piston assembly in the combustion cylinder of an engine. Alternatively, as-cast conventional steel castings may be used which, prior to friction welding the crown and skirt components, the crown typically undergoes extensive and costly machining operations, which includes incorporating one or more circumferentially disposed recesses that are configured to accept sealing rings and machining of the interior of the piston for dimensional consistency.

Additionally, the adaptation and employment of the precision cast net to finished dimension welding surfaces and the location thereof in the form of curvilinear and/or multi-arcuate surface of the area of the piston at such a locations provides for the desired location of the uppermost of the several sealing rings adjacent to the piston crown to minimize retention of non-combustible gasses.

It is to be appreciated that the employment of precision cast to net dimensions with respect to the weld joint surfaces produces the required curvilinear and/or multi-arcuate surface of the area of the piston necessary to direct and manage the ejectment of the weld flash to prevent incomplete fusion of the welded joint, excess weld flash, weld flash retention in lieu of ejection, flash adherence to adjacent surfaces, flash detachment or tearing and further difficulties in obtaining consistent welded joints in a series production manufacturing environment.

Another potential benefit of the employment of precision cast to net dimensions with respect to the weld joint surfaces can provide the required curvilinear and/or multi-arcuate surface of the area of the piston at such a location that ensures that the desired distance between the centerline of the pin bore and the piston crown is obtained at the completion of the welding process.

Furthermore, the reduced height upper connecting surface has a curvilinear and/or arcuate cross-section, so that the excess material (generically referred to as "flash" or "weld flash" generated by and resulting from the welding process is controlled in such a manner by the curvilinear and/or multi-arcuate configuration of the cast and/or forged piston adjacent to the weld surface to enable the full ejection of flash from the location of the friction weld joint providing thereby a complete welded joint which is free from inclusions, defects, and voids.

Yet another potential benefit of the described structures and methods is the reduction in the dimension between the upper surface of the piston crown and upper surface of the highest adjacent one of a plurality of sealing rings to reduce the amount of gasses in the combustion chamber residing between the top surface of said sealing ring and the combustion chamber, and therefore reduce the operating temperature of the piston and ring assembly and enhance the combustion process by minimizing non-combustible gases in the combustion process.

Additionally, the employment of forging with respect to the weld joint surfaces provides the required curvilinear and/or multi-arcuate surface of the area of the piston at such a location that ensures that the desired distance between the centerline of the pin bore and the piston crown is maintained during the welding process by the avoidance of excess weld flash, weld flash retention in lieu of ejection, flash adherence to adjacent surfaces, flash detachment or tearing and further difficulties in obtaining consistent welded joints in a series production manufacturing environment.

While several embodiments of the present disclosure have been described, it should be understood that the present disclosure is not so limited and modifications may be made without departing from the present disclosure. The scope of the present disclosure is defined by the appended claims, and all devices, processes, and methods that come within the meaning of the claims, either literally or by equivalence, are intended to be embraced therein.

The invention claimed is:

1. A piston for use in an internal combustion engine, said piston comprising:
    an upper member, wherein said upper member includes:
    a crown located at a top surface of said upper member;
    a combustion surface extending radially inward from said crown;
    a first upper connecting surface integrally formed on a bottom side of said upper member, said first upper connecting surface is downwardly directed;
    a second upper connecting surface integrally formed on said bottom side of said upper member, said second upper connecting surface is downwardly directed,
    wherein said first and second upper connecting surfaces are concentrically oriented, and at least one of said upper connecting surfaces includes a curvilinear and/or multi-arcuate cross-sectional profile between a root portion of said at least one upper connecting surfaces and a lowest portion of said at least one upper connecting surfaces, and wherein the first upper connecting surface has a greater cross-sectional width at the root portion than a cross-section width at the lowest portion, and wherein the curvilinear and/or multi-arcuate cross-sectional profile between the root portion of said at least one upper connecting surfaces and the lowest portion of said at least one upper connecting surfaces does not include vertical or substantially vertical sides to the first upper connecting surface;
    a lower member, wherein said lower member includes:
    a pair of opposing skirts, each skirt defines a bore formed therethrough, said bore having a bore centerline;
    a first lower connecting surface integrally formed on a top side of said lower member, said first lower connecting surface is upwardly directed; and
    a second lower connecting surface integrally formed on a top side of said lower member, said second lower connecting surface is upwardly directed, wherein said first and second lower connecting surfaces are concentrically oriented;
    wherein said lower member is integrally connected to said upper member by friction welding such that said first upper connecting surface and said first lower connecting surface form a first welded joint therebetween and said second upper connecting surface and said second lower connecting surface form a second welded joint therebetween, and said curvilinear and/or multi-arcuate cross-section enables a reduced distance between said top surface of said crown and said bore centerline of said bore.

2. The piston of claim 1, wherein said curvilinear and/or multi-arcuate profile is configured to control, direct and/or limit an amount of friction welding flash that may occupy space within said integral cooling oil reservoir.

3. The piston of claim 1, wherein one or both of said upper and lower members comprise a forging.

4. The piston of claim 1, wherein one or both of said upper and lower members comprise a precision casting to net final dimensions.

5. The piston of claim 1, further comprising at least one circumferential groove formed into an outer surface of said upper member and at least one circumferential groove formed into an outer surface of said lower member.

6. The piston of claim 1, further comprising at least one integral cooling oil reservoir formed adjacent to said combustion surface when said upper and lower members are friction welded together.

7. The piston of claim 1, wherein said first upper connecting surface is positioned radially inward relative to said second upper connecting surface and said first lower connecting surface is positioned radially inward relative to said second lower connecting surface.

8. The piston of claim 1, wherein said first upper connecting surface and said second upper connecting surface are substantially coplanar, and said first lower connecting surface and said second lower connecting surface are substantially coplanar.

9. The piston of claim 1, wherein said first upper connecting surface is vertically offset relative to said second upper connecting surface, and said first lower connecting surface is vertically offset from said second lower connecting surface.

10. The piston of claim 1, wherein said first and second upper connecting surfaces are substantially parallel with respect to said crown.

11. The piston of claim 1, wherein at least one of said first and second upper connecting surfaces is formed at a right angle relative to said crown.

12. The piston of claim 1, wherein said curvilinear and/or multi-arcuate cross-section is configured to reduce and/or eliminate an axial force urging apart said upper member and said lower member.

13. The piston of claim 1, wherein said curvilinear and/or multi-arcuate profile is configured to control, direct and/or limit an amount of friction welding flash that may occupy space within said integral cooling oil reservoir.

14. The piston of claim 1, wherein said first upper connecting surface, said second upper connecting surface, said first lower connecting surface, and said second lower connecting surface are precision cast to net final dimensions.

15. The piston of claim 1, further comprising at least one circumferential groove formed into an outer surface of said upper member and at least one circumferential groove formed into an outer surface of said lower member.

16. The piston of claim 1, further comprising at least one integral cooling oil reservoir formed adjacent to said combustion surface when said upper and lower members are friction welded together.

17. The piston of claim 1, wherein said first upper connecting surface is positioned radially inward relative to said second upper connecting surface and said first lower connecting surface is positioned radially inward relative to said second lower connecting surface.

18. The piston of claim 1, wherein said first upper connecting surface and said second upper connecting surface are substantially coplanar, and said first lower connecting surface and said second lower connecting surface are substantially coplanar.

19. The piston of claim 1, wherein said first upper connecting surface is vertically offset relative to said second upper connecting surface, and said first lower connecting surface is vertically offset from said second lower connecting surface.

20. The piston of claim 1, wherein said first and second upper connecting surfaces are substantially parallel with respect to said crown.

21. The piston of claim 1, wherein at least one of said first and second upper connecting surfaces is formed at a right angle relative to said crown.

22. A piston for use in an internal combustion engine, said piston comprising:
an upper member comprising a casting that is precision cast to net dimensions wherein said upper member includes:
a crown located at a top surface of said upper member;
a combustion surface extending radially inward from said crown;
a first upper connecting surface integrally formed on a bottom side of said upper member, said first upper connecting surface is downwardly directed;
a second upper connecting surface integrally formed on said bottom side of said upper member, said second upper connecting surface is downwardly directed,
wherein said first and second upper connecting surfaces are concentrically oriented, and at least one of said upper connecting surfaces includes a curvilinear and/or multi-arcuate cross-sectional profile between a root portion of said at least one upper connecting surfaces and a lowest portion of said at least one upper connecting surfaces, and wherein the first upper connecting surface has a greater cross-sectional width at the root portion than a cross-section width at the lowest portion, and wherein the curvilinear and/or multi-arcuate cross-sectional profile between the root portion of said at least one upper connecting surfaces and the lowest portion of said at least one upper connecting surfaces does not include vertical or substantially vertical sides to the first upper connecting surface;
a lower member comprising a casting that is precision cast to net dimensions wherein said lower member includes:
a pair of opposing skirts, each skirt defines a bore formed therethrough, said bore having a bore centerline;
a first lower connecting surface integrally formed on a top side of said lower member, said first lower connecting surface is upwardly directed; and
a second lower connecting surface integrally formed on a top side of said lower member, said second lower connecting surface is upwardly directed, wherein said first and second lower connecting surfaces are concentrically oriented;
wherein said lower member is integrally connected to said upper member by friction welding such that said first upper connecting surface and said first lower connecting surface form a first welded joint therebetween and said second upper connecting surface and said second lower connecting surface form a second welded joint therebetween, and wherein said curvilinear and/or multi-arcuate profile is configured to control, direct and/or limit an amount of friction welding flash that may occupy space within said integral cooling oil reservoir.

23. The Piston of claim 22, wherein said curvilinear and/or multi-arcuate profile is configured to control, direct and/or limit an amount of friction welding flash that may occupy space within said integral cooling oil reservoir.

24. The piston of claim 22, wherein said first upper connecting surface, said second upper connecting surface, said first lower connecting surface, and said second lower connecting surface are precision cast to net final dimensions.

25. The piston of claim 22, further comprising at least one circumferential groove formed into an outer surface of said upper member and at least one circumferential groove formed into an outer surface of said lower member.

26. The piston of claim 22 further comprising at least one integral cooling oil reservoir formed adjacent to said combustion surface when said upper and lower members are friction welded together.

27. The piston of claim 22, wherein said first upper connecting surface is positioned radially inward relative to said second upper connecting surface and said first lower connecting surface is positioned radially inward relative to said second lower connecting surface.

28. The piston of claim 22, wherein said first upper connecting surface and said second upper connecting surface are substantially coplanar, and said first lower connecting surface and said second lower connecting surface are substantially coplanar.

29. The piston of claim 22, wherein said first upper connecting surface is vertically offset relative to said second upper connecting surface, and said first lower connecting surface is vertically offset from said second lower connecting surface.

30. The piston of claim 22, wherein said first and second upper connecting surfaces are substantially parallel with respect to said crown.

31. The piston of claim 22, wherein at least one of said first and second upper connecting surfaces is formed at a right angle relative to said crown.

32. The piston of claim 22, wherein said upper and lower members are precision cast to net final dimensions such that said upper and lower members have a cast dimensional tolerance between about +/−0.010 inches to about +/−0.020 inches.

33. The piston of claim 22, wherein said upper and lower members are precision cast to net final dimensions such that said upper and lower members have a surface finish roughness of less than about 125 Ra.

34. The piston of claim 22, wherein said curvilinear and/or multi-arcuate cross-section is configured to reduce and/or eliminate an axial force urging apart said upper member and said lower member.

35. A method of manufacturing a piston comprising:
precision casting to net final dimensions an upper member, wherein said upper member includes a combustion surface and at least two upper connecting surfaces concentrically arranged and spaced vertically apart from said combustion surface, wherein at least one of said upper connecting surfaces includes a curvilinear and/or multi-arcuate cross-sectional profile between a root portion of said at least one upper connecting surfaces and a lowest portion of said at least one upper connecting surfaces, and wherein a first upper connecting surface has a greater cross-sectional width at the root portion than a cross-section width at the lowest portion, and wherein the curvilinear and/or multi-arcuate cross-sectional profile between the root portion of said at least one upper connecting surfaces and the lowest portion of said at least one upper connecting surfaces does not include vertical or substantially vertical sides to the first upper connecting surface;
precision casting to net final dimensions a lower member, wherein said lower member includes a pair of opposing skirts having a bore formed through each of said skirts, said lower member also includes at least two lower connecting surfaces concentrically arranged; and
friction welding said lower member to said upper member, wherein a welded joint is formed between each of said upper connecting surfaces of said upper member and a corresponding lower connecting surface of said lower member, and
wherein said curvilinear and/or multi-arcuate profile is configured to control, direct and/or limit an amount of friction welding flash that may occupy space within said integral cooling oil reservoir, and
wherein said curvilinear and/or multi-arcuate cross-section is configured to reduce and/or eliminate an axial force urging apart said upper member and said lower member.

36. The method of claim 35, wherein at least one of said lower connecting surfaces includes a curvilinear and/or multi-arcuate cross-sectional profile between a root portion of said at least one lower connecting surfaces and a lowest portion of said at least one lower connecting surfaces.

37. A method of manufacturing a piston comprising:
forging an upper member;
forging a lower member; and
friction welding said lower member to said upper member, wherein a welded joint is formed between each of said upper connecting surfaces of said upper member and a corresponding lower connecting surface of said lower member,
wherein said piston comprises:
an upper member, wherein said upper member includes:
a crown located at a top surface of said upper member;
a combustion surface extending radially inward from said crown;
a first upper connecting surface integrally formed on a bottom side of said upper member, said first upper connecting surface is downwardly directed;
a second upper connecting surface integrally formed on said bottom side of said upper member, said second upper connecting surface is downwardly directed,
wherein said first and second upper connecting surfaces are concentrically oriented, and at least one of said upper connecting surfaces includes a curvilinear and/or multi-arcuate cross-sectional profile between a root portion of said at least one upper connecting surfaces and a lowest portion of said at least one upper connecting surfaces, and wherein a first upper connecting surface has a greater cross-sectional width at the root portion than a cross-section width at the lowest portion, and wherein the curvilinear and/or multi-arcuate cross-sectional profile between the root portion of said at least one upper connecting surfaces and the lowest portion of said at least one upper connecting surfaces does not include vertical or substantially vertical sides to the first upper connecting surface;
a lower member, wherein said lower member includes:
a pair of opposing skirts, each skirt defining a bore formed therethrough, said bore having a bore centerline;
a first lower connecting surface integrally formed on a top side of said lower member, said first lower connecting surface is upwardly directed; and
a second lower connecting surface integrally formed on a top side of said lower member, said second lower connecting surface is upwardly directed, wherein said first and second lower connecting surfaces are concentrically oriented,
wherein said lower member is integrally connected to said upper member by friction welding such that said first upper connecting surface and said first lower connecting surface form a first welded joint therebetween and said second upper connecting surface and said second lower connecting surface form a second welded joint therebetween,
wherein said curvilinear and/or multi-arcuate profile enables a reduced distance between said top surface of said crown and said bore centerline of said bore,
wherein said curvilinear and/or multi-arcuate profile is configured to control, direct and/or limit an amount of friction welding flash that may occupy space within said integral cooling oil reservoir, and
wherein said curvilinear and/or multi-arcuate cross-section is configured to reduce and/or eliminate an axial force urging apart said upper member and said lower member.

* * * * *